US008695095B2

(12) United States Patent
Baliga et al.

(10) Patent No.: US 8,695,095 B2
(45) Date of Patent: Apr. 8, 2014

(54) MOBILE MALICIOUS SOFTWARE MITIGATION

(75) Inventors: Arati Baliga, Edison, NJ (US); Baris Coskun, Weehawken, NJ (US); Christopher Van Wart, Allenhurst, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 106 days.

(21) Appl. No.: 13/045,916

(22) Filed: Mar. 11, 2011

(65) Prior Publication Data
US 2012/0233694 A1 Sep. 13, 2012

(51) Int. Cl.
*H04L 29/06* (2006.01)
*G06F 15/16* (2006.01)

(52) U.S. Cl.
USPC ............................................. 726/24; 709/224

(58) Field of Classification Search
None
See application file for complete search history.

(56) References Cited

U.S. PATENT DOCUMENTS

| | | | | |
|---|---|---|---|---|
| 5,991,881 A * | 11/1999 | Conklin et al. | ................. | 726/22 |
| 6,741,855 B1 * | 5/2004 | Martin et al. | ................. | 455/419 |
| 7,280,826 B2 * | 10/2007 | Nylander et al. | ............. | 455/433 |
| 7,316,031 B2 * | 1/2008 | Griffith et al. | ................. | 726/22 |
| 7,406,320 B1 * | 7/2008 | Kumar et al. | ............. | 455/456.1 |
| 7,603,710 B2 * | 10/2009 | Harvey et al. | ................. | 726/23 |
| 7,607,021 B2 * | 10/2009 | Rayes et al. | ................. | 713/188 |
| 7,823,199 B1 * | 10/2010 | Rathi et al. | ..................... | 726/22 |
| 7,854,001 B1 * | 12/2010 | Chen et al. | ....................... | 726/22 |
| 8,056,132 B1 * | 11/2011 | Chang et al. | .................... | 726/23 |
| 2004/0245330 A1 * | 12/2004 | Swift et al. | ..................... | 235/379 |
| 2006/0059096 A1 * | 3/2006 | Dublish et al. | .................. | 705/57 |
| 2006/0128406 A1 * | 6/2006 | Macartney | ..................... | 455/466 |
| 2006/0294588 A1 * | 12/2006 | Lahann et al. | .................. | 726/23 |
| 2007/0097976 A1 * | 5/2007 | Wood et al. | .................... | 370/392 |
| 2007/0234426 A1 * | 10/2007 | Khanolkar et al. | ............. | 726/23 |
| 2008/0016208 A1 * | 1/2008 | Treinen | ......................... | 709/224 |
| 2008/0028463 A1 * | 1/2008 | Dagon et al. | .................... | 726/22 |
| 2008/0209033 A1 * | 8/2008 | Ginter et al. | .................. | 709/224 |
| 2008/0263660 A1 * | 10/2008 | Duffau et al. | .................. | 726/22 |
| 2008/0295171 A1 * | 11/2008 | Singh et al. | ..................... | 726/23 |
| 2009/0249480 A1 * | 10/2009 | Osipkov et al. | ................. | 726/22 |
| 2010/0054221 A1 * | 3/2010 | Tang | ............................. | 370/338 |
| 2010/0064039 A9 * | 3/2010 | Ginter et al. | .................. | 709/224 |
| 2010/0095374 A1 * | 4/2010 | Gillum et al. | .................... | 726/22 |
| 2010/0132040 A1 * | 5/2010 | Bhagwat et al. | ................. | 726/23 |
| 2010/0199338 A1 * | 8/2010 | Craddock et al. | ................. | 726/7 |
| 2010/0313264 A1 * | 12/2010 | Xie et al. | ........................ | 726/22 |
| 2011/0030055 A1 * | 2/2011 | Balay et al. | ..................... | 726/22 |
| 2012/0151593 A1 * | 6/2012 | Kang et al. | ..................... | 726/25 |

* cited by examiner

*Primary Examiner* — Christopher Revak
(74) *Attorney, Agent, or Firm* — Amin, Turocy & Watson, LLP

(57) ABSTRACT

Mitigation of malicious software in wireless networks and/or on mobile devices is provided. A mobile malicious software mitigation component is provided that obtains an internet protocol address that is exhibiting malicious software behavior, a profile of the malicious software behavior, and a time of the malicious software behavior. The malicious software mitigation component can determine an identity of a mobile device that was assigned the internet protocol address during the time it was exhibiting malicious software behavior, and transmit the profile to the mobile device. In addition, the malicious software mitigation component determine if the duration of the assignment of the internet protocol address to the mobile device is sufficient for positive identification.

20 Claims, 17 Drawing Sheets

MOBILITY LOG — 602

| IP ADDRESS — 604 | START TIME — 606 | END TIME — 608 | DEVICE IDENTIFICATION — 610 |
|---|---|---|---|
| IP1 | T1 | T2 | IMSI / IMEI |
| IP2 | T4 | T12 | IMSI / IMEI |
| IP8 | T24 | T38 | IMSI / IMEI |
| IP5 | T30 | T76 | IMSI / IMEI |
| IP1 | T80 | T81 | IMSI / IMEI |
| ... | ... | ... | ... |
| IPX | TSTARTX | TENDX | IMSI / IMEI |

612

FIG. 6

MOBILE MALICIOUS SOFTWARE MITIGATION

TECHNICAL FIELD

The subject disclosure relates to mobile communications and, more particularly, to detection and mitigation of malicious software in wireless communication systems and/or on mobile communication devices.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

Technological advances have provided significant increases in the computing power and networking capabilities of mobile devices. For instance, a number of smart phones and personal digital assistants (PDA) currently run full-fledged operating systems, employ powerful processors, and have broadband connectivity to the internet that rivals desktop computers and laptops. The technical capabilities of these devices have made them appealing to professionals, students, and casuals users alike. This broad appeal has resulted in a large user base that is non-technical in nature, and has little understanding of digital security threats, which makes the ever more powerful mobile devices an attractive target for cyber criminals.

In particular, malicious software infecting mobile devices is a growing concern for mobile device users and wireless network administrators. Since these devices are ubiquitous and are expected to outnumber personal computers in the near future, they are high-value targets for cyber criminals intending to control, own and rent them for cyber criminal activities. A compromised mobile device can cause serious issues for both the user and the associated communication infrastructure. Malicious software on a mobile device can transmit spam messages over the wireless network, make expensive international calls, track and disrupt user activity, or send text messages to premium numbers without the user's knowledge or permission. Accordingly, it would be desirable to implement techniques for effectively mitigating malicious software (malware) in mobile devices and wireless communication systems.

The above-described deficiencies of wireless systems with respect to malware are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary of the disclosure in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems and methods are provided for the mitigation of mobile malicious software (malware). A malware detection engine can analyze data traffic and data flows on a network, and employ a plurality of techniques to identify internet protocol (IP) addresses that are suspected of engaging in malware behavior. The malware detection engine can generate traffic profiles of the suspected malware behavior, and forward the IP addresses and traffic profiles to a malware mitigation component. The malware mitigation component can leverage logging mechanisms available to core mobility network elements to identify devices associated with the IP addresses, and forward the traffic profiles to the identified devices. Upon receipt of the traffic profile, individual devices can correlate data traffic on the devices to the traffic profiles in order to identify one or more applications on the devices responsible for the suspected malware behavior. The devices can remove the applications, or take other mitigating actions, such as selectively dropping data packets generated by the applications.

In accordance with one aspect, a method is provided for malicious software mitigation in a wireless network that includes the steps of receiving an internet protocol address that is exhibiting malicious software behavior, and a profile of the malicious software behavior being exhibited, comparing the internet protocol address to a set of mobility logs maintaining information about activities of a set of devices associated with the wireless network, and determining an identity of a device associated with the internet protocol address based on the comparing.

In accordance with another aspect, a system is provided that includes an alert acquisition component configured to receive an internet protocol address that is engaging in malicious software behavior, a profile of the malicious software behavior, and a time frame when the internet protocol address was engaging in the malicious software behavior, a correlation component configured to analyze a set of logs that maintain records regarding activities of a set of devices associated with the wireless network, and configured to determine an identifying characteristic of a mobile device that was assigned the internet protocol address during the time frame the internet protocol address was engaging in the malicious software behavior, and a communication component configured to send the profile to the mobile device.

In accordance with yet another aspect, a method is provided for botnet mitigation in a wireless network that includes the steps of obtaining, from a core network, an internet protocol address that is exhibiting bot behavior, a profile of the bot behavior, and a time when the internet protocol address was exhibiting the bot behavior, analyzing a set of mobility logs maintaining internet protocol address assignments by a mobility network and determining that at least one device in a set of devices associated with the wireless network was assigned the internet protocol address at the time the internet protocol address was exhibiting the bot behavior, determining an identity of the at least one device based on the analyzing, and communicating the profile to the at least one device.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF DRAWINGS

FIG. 6 illustrates an example mobility log in accordance with aspects described herein.

DETAILED DESCRIPTION

Figure 1:
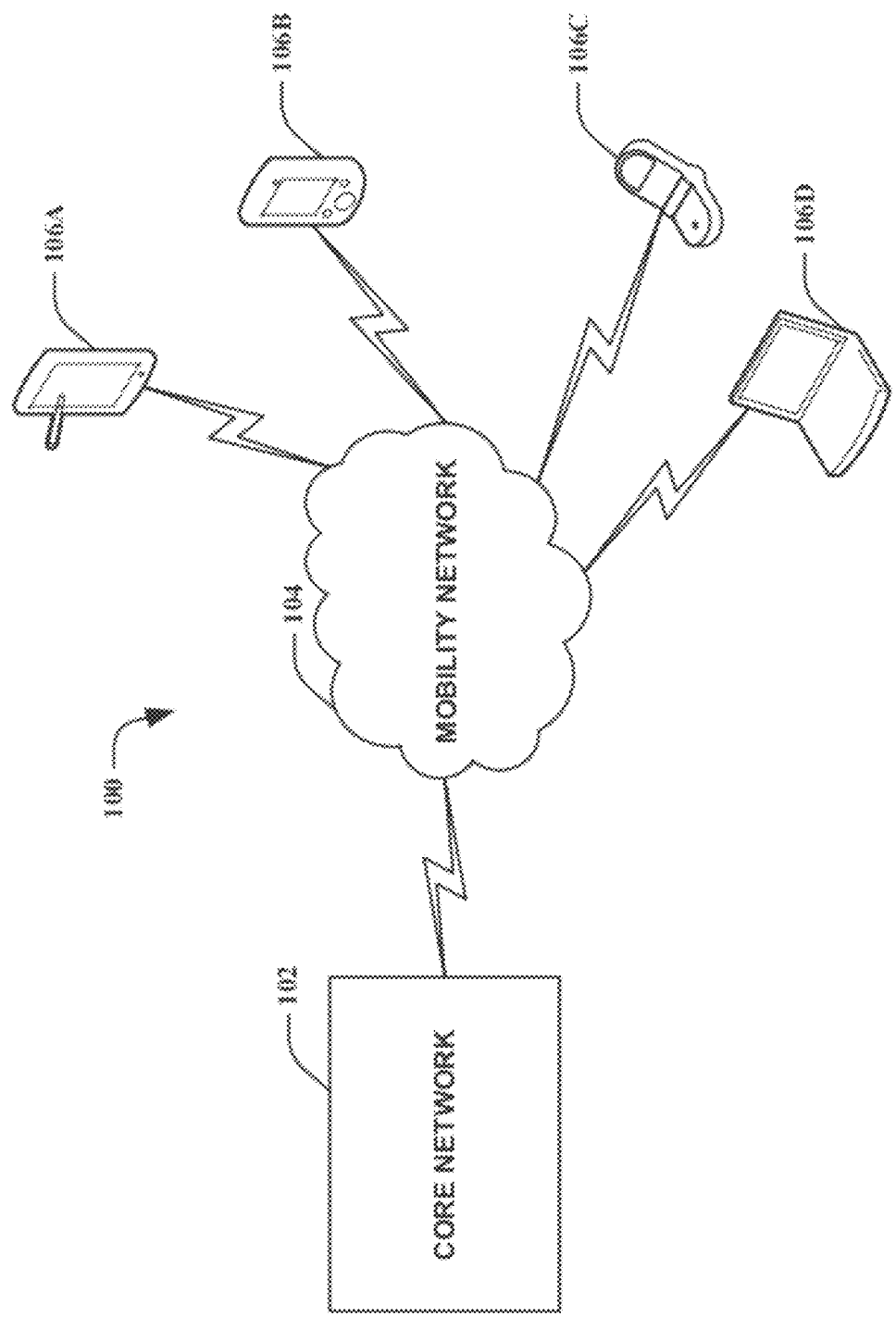
FIG. 1 illustrates an example communications network in accordance with various aspects described herein.

The subject disclosure is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "mobile device," "wireless device," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., content or directives) and signaling streams can be packetized or frame-based flows.

Furthermore, the terms "user," "subscriber," "customer," "consumer," "agent," and the like are employed interchangeably throughout the subject specification, unless context warrants particular distinctions among the terms. It should be appreciated that such terms can refer to human entities or automated components supported through artificial intelligence (e.g., a capacity to make inferences based on complex mathematical formalisms) which can provide simulated vision, sound recognition, and so forth.

FIG. 1 illustrates an example network 100 in accordance with various aspects described herein. The network 100 includes a core network 102, a mobility network 104, and a plurality of mobile devices 106. The core network 102 can have a plurality functions including, but not limited to, session management, and transport for data packets in the network 100. The core network 102 is also referred to as the backbone network, in part, because it connects the mobility network to the Internet. For example, the core network 102 can be comprised of a wired internet protocol (IP) network where both wired traffic and wireless or mobility traffic traversing the internet flows. Virtually all data transacted on the mobility network 104 (e.g., data flows, data traffic) will flow through the core network 102.

The mobility network 104 can have a plurality of functions including, but not limited to, enabling access to the network 100 by the mobile devices 106, allocating network resources (e.g., internet protocol addresses, etc.) to the mobile devices 106, handling traffic/signaling between the mobile devices 106 and the core network 102, providing mobility management, and so forth. Mobility management can include, but is not limited to, tracking the location of the mobile devices 106, and enabling: calling; text messaging (e.g., SMS); multimedia messaging (e.g., MMS); internet service and browsing;

and other mobile services to be provided to the mobile devices 106. The mobility network 104 can include a plurality of base stations or access points (not shown) that enable the mobile devices 106 to communicate with a plurality of devices on the Internet, wherein the traffic is carried by the core network 102.

The mobile devices 106 can include, but are not limited to, tablet computers, smart phones, mobile phones, netbooks, portable music players, personal digital assistants (PDAs), laptops, electronic book devices, global positioning systems (GPS), and so forth. For example, FIG. 1 illustrates the network 100 containing a plurality of mobile devices, including a tablet computer 106A, a smart phone 106B, a mobile phone 106C, and a netbook 106*d* connected to the mobility network 104. The mobile devices 106 can use the network 100 to access the internet, send/receive text messages, send/receive multimedia messages, execute voice calls, download applications, and so forth. The enhanced connectivity and technical capabilities of mobile devices 106 can leave them vulnerable to malicious software (malware), including malicious bots controlled by cyber criminals. For example, the mobile devices 106 can receive text messages that exploit one or more vulnerabilities in the operating system of the mobile devices 106 to install malware, access a website that installs malware on the mobile devices 106, access an electronic mail (email) link that installs malware on the mobile devices 106, or download a program/application that appears to be harmless (e.g., a video game, etc.), but is in fact malware. The malware can attack various functionality or memory sectors of the mobile devices 106, or can integrate compromised mobile devices 106 into a botnet, wherein the malware interacts with other compromised devices to form a small network, so that they can attack targets cooperatively (discussed below).

Figure 2:
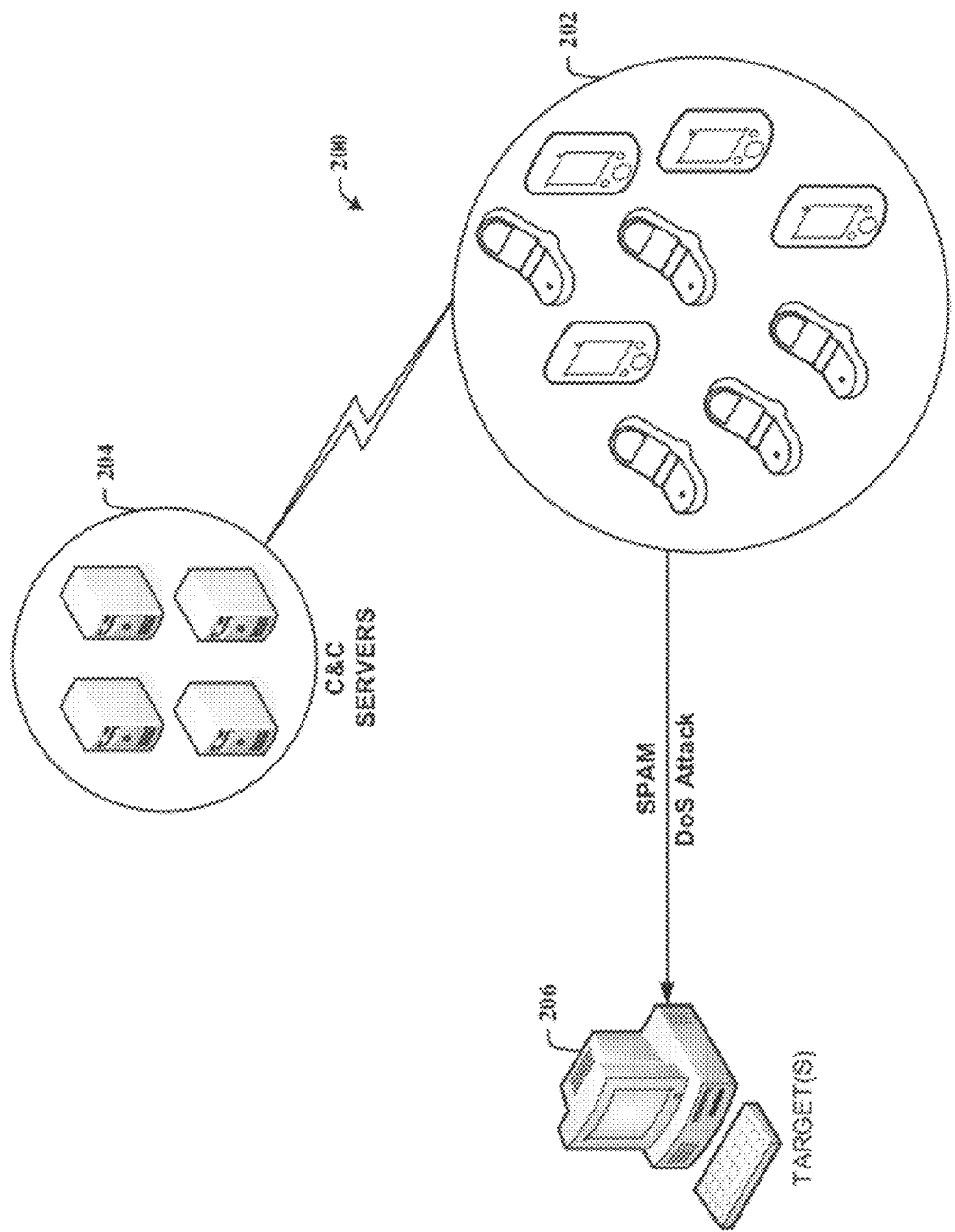
FIG. 2 illustrates is an example botnet system in accordance with aspects described herein.

Malicious software (malware) is software that is typically designed to access a computer system without an owner or user's permission. Malware can include but is not limited to computer viruses, worms, Trojan horses, spyware, adware, scareware, crimeware, rootkits, key loggers, and botnets. Turning now to FIG. 2, illustrated is an example botnet 200 in accordance with aspects described herein. The botnet 200 includes a plurality of compromised mobile devices 202. As discussed previously, the compromised mobile devices 202 can be infected with malware via a plurality of techniques, including but not limited to text/multimedia messages, email, websites, and/or applications. When the mobile devices 202 are compromised, the malware can integrate the compromised mobile devices 202 into the botnet 200. Each of the compromised mobile devices 202 can be controlled by a set of command and control servers 204. It is to be appreciated that the set of command and control servers 204 can be comprised of a single command and control server. Typically, the set of command and control servers 204 are operated by a user acting as a bot master. For example, the bot master can issue commands to the compromised mobile devices 202, via the set of command and control servers 204, to generate spam messages directed toward a set of remote targets 206. It can be desirable for a bot master to generate spam using a large number of compromised mobile devices 202, as opposed to a single source, in order to escape detection. As an additional example, the bot master can issue commands to the compromised mobile devices 202, via the set of command and control servers 204, to execute a denial of service (DoS) attack against the set of remote targets 206. During a DoS attack, essentially, the bot master will use the compromised mobile devices 202 to saturate the set of remote targets 206 (e.g., website, web server, etc.) with communication requests (e.g., pings).

Additionally or alternatively, the compromised mobile devices 202 can be arranged in a peer-to-peer bot network (P2P botnet). In the P2P botnet, there is not a command and control server 204; rather, each compromised mobile device 202 is both a server and a client. The bot master can inject commands at any point in the P2P botnet, and the commands are disseminated among the compromised mobile devices using a peer-to-peer (P2P) communication protocol. Based on the foregoing, it can be appreciated that it would be desirable for mobile device users and wireless network administrators to have a system and/or method for detecting and mitigating malware, such as botnets, from infecting mobile devices.

Figure 3:
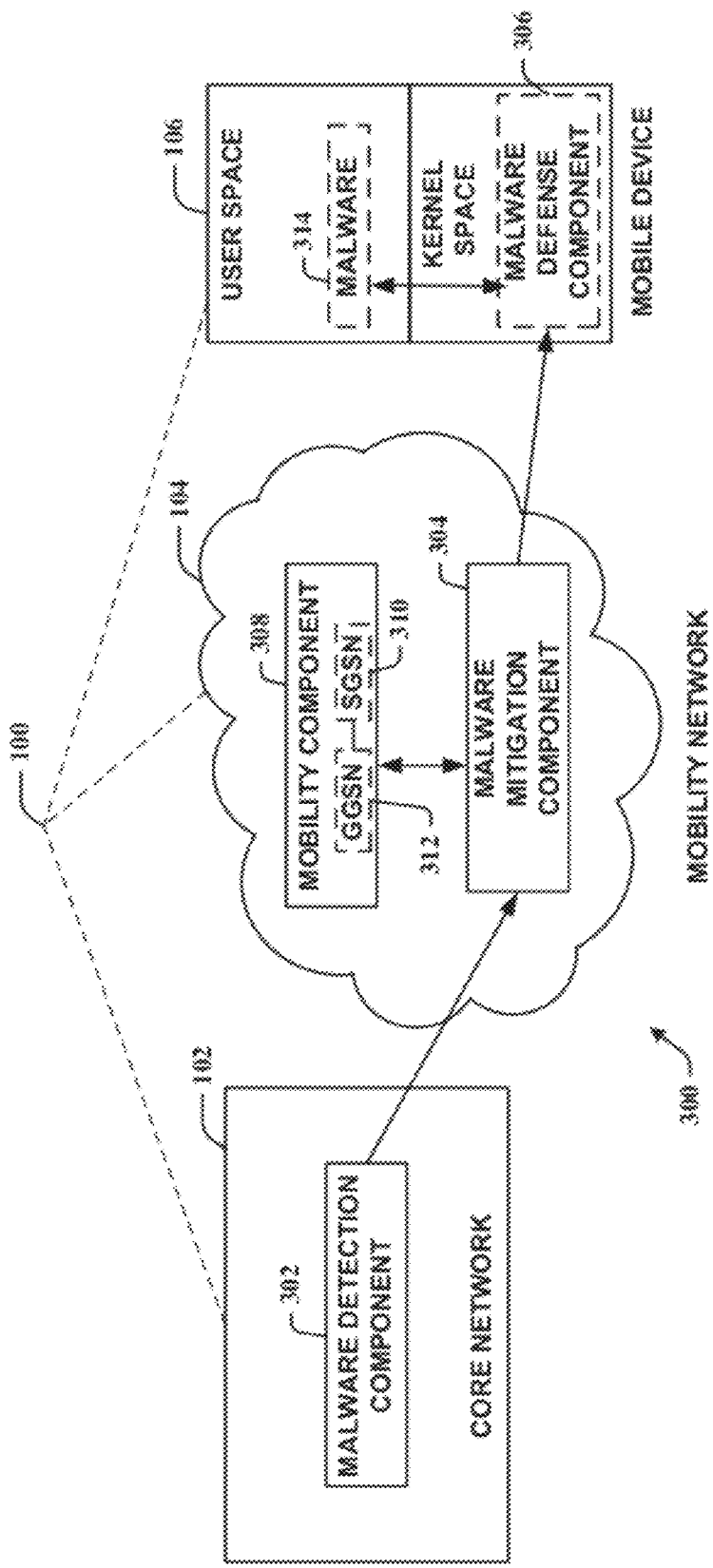
FIG. 3 illustrates an example block diagram of a malware mitigation system in accordance with aspects described herein.

Referring to FIG. 3, illustrated is an example block diagram of a malicious software mitigation system 300 in accordance with aspects described herein. The malicious software (malware) mitigation system 300 includes a malware detection component 302, a malware mitigation component 304, and a malware defense component 306. The malware detection component 302 operates, functions, or otherwise executes in the core network 102. The term core network as used herein can refer to the core network 102, or an edge of the network 100, where the core network 102 connects to the mobility network 104. Placement of the malware detection component 302 in the core network 102, or the edge of the network 100, enables the malware detection component to analyze data flows and detect data flow patterns from virtually everywhere in the network 100 and/or mobility network 104.

The malware detection component 302 can identify, recognize, or otherwise detect a set of IP addresses behaving in a manner consistent with a malware infection (e.g., exhibiting malware behavior), and can also generate a traffic profile corresponding with the detected behavior. For example, a common form of malware is a botnet, and typical bot behavior can include transmitting spam messages, scanning the network 100, and/or generating a set of traffic anomalies, wherein traffic anomalies consist at least in part of a set of data flows outside of or beyond the set data flows typically observed on the network 100. If the bot is an internet relay chat (IRC) bot, then the traffic profile of the bot can include sending traffic on a specific IRC port. Additionally or alternatively, the malware detection component 302 can detect data flows from a bot on a compromised mobile device 106 to a known command and control server (See FIG. 2), and generate a traffic profile relating to communication with the known command and control server. Additionally or alternatively, the malware detection component 302 can detect peer-to-peer botnets in the mobility network 104. The malware detection component 302 can provide information relating to detected malware, including IP addresses, and traffic profiles, to the malware mitigation component 304.

The malware mitigation component 304 operates, functions, or otherwise executes in the mobility network 104. As discussed supra, the functionality of the mobility network 104 can include, but is not limited to, allocating network resources (e.g., IP address, etc.) to the mobile device 106, handling traffic and signaling between the mobile device 106 and the core network 102, and so forth. The mobility network 104 can include a mobility component 308 that tracks mobility information, such as an assigned IP address, physical location, and so forth of the mobile device 106. Where the network 100 is a second generation (2G) or a third generation (3G) network, the mobility component 308 can include a set of General Packet Radio Service Support Nodes, including, for example, a serving GPRS support node (SGSN) 310 and a gateway GPRS support node (GGSN) 312. The responsibilities of the SGSN 310 can include, but are not limited to, delivery of data packets to and from mobile devices within its geographical service area, packet routing and transfer, and authentication and charging functions. The GGSN 312 can be responsible for maintaining current location information for the mobile device 106, and maintaining routing data necessary to tunnel data to the SGSN 310 that services the particular mobile device 106. It is to be appreciated, that the aspects described herein are not limited to 2G or 3G networks, but can also be employed on various other communications networks, including, but not limited to, fourth generation (4G) wireless communication networks, such as those complying with the long term evolution (LTE) standards.

In a wireless network 100 the mobile device 106 can be assigned a virtually unique IP address for different communication sessions. For example, the mobility component 308 can assign the mobile device 106 a disparate IP address for each data request from the mobile device 106. The IP address may be selective assigned from a set of available IP addresses at the time of assignment. The mobility component 308, and the SGSN 310 and the GGSN 312 in particular, can maintain a set of mobility logs that identify an International Mobile Subscriber Identity (IMSI) and/or an International Mobile Equipment Identity (IMEI) with an IP address that was assigned to the mobile device 106 for a given time period. Typically, an individual mobile device 106 will have a unique IMEI associated only with that mobile device 106. In addition, a mobile subscriber, typically, will have a unique IMSI that is associated only with the individual mobile subscriber and provisioned on a mobile device, for example, via a SIM card. Therefore, it can be appreciated that identifying an IMEI and/or an IMSI enables identification of a particular mobile device and/or a particular mobile device subscriber.

The malware mitigation component 304 obtains, receives, or otherwise acquires information relating to detected malware from the malware detection component 302, including suspect IP addresses and/or associated traffic profiles. The malware mitigation component 304 can correlate the suspect IP addresses with the mobility logs maintained by the General Packet Radio Service Support Nodes (e.g., the SGSN 310 or the GGSN 312) in order to obtain identification (e.g., IMSI or IMEI) of a suspect mobile device. The malware mitigation component 304 can transmit, send, or otherwise communicate a warning message to the malware defense component 306 on the suspect mobile device 106. The warning message can include, but is not limited to, the traffic profile of the malware infecting the mobile device 106, and/or a flag indicating that the mobile device (106) has been compromised by potential malware. The malware mitigation component 304 can determine a physical location of the mobile device 106, and communicate with the mobile device 106 via the mobility component 308.

The malware defense component 306 operates, functions, or otherwise executes in kernel space of the mobile device 106. The malware defense component 306 can correlate the flow of data in the kernel space of the mobile device 106 to the traffic profile included in the warning message in order to indentify, locate, or otherwise determine an application or binary 314 that is generating the information contained in the traffic profile. The malware defense component 306 is able to inspect or intercept all data traffic on the mobile device 106 generated by applications and/or binaries, because it executes in the kernel space of the mobile device 106. When the malware defense component 306 has identified the application or binary related to the traffic profile the malware defense component 306 can remove, delete, or otherwise erase the application or binary from the device. Additionally or alternatively, the malware defense component 306 can prompt a user to inform them that the binary or application is behaving as malware, and allow the user to determine to remove, delete, or otherwise the erase the application or binary from the device. If the user determines not to remove the binary or application behaving as malware, the malware defense component 306 can perform additional mitigating actions including, but not limited to, selectively dropping packets originating from the binary or application behaving as a malware. It is to be appreciated that a plurality of applications and/or binaries may correlate to the traffic profile obtained by the malware defense component 306. For instance, a user may have downloaded a plurality of games from the same publisher, wherein each game is infected with the same bot. It is to be appreciated that the malware defense component 306 can additionally or alternatively operate on a wired device (not shown), wherein the malware defense component 306 operable on a wired device can obtain the warning message from the malware detection component 302 or the malware mitigation component 304.

Figure 4:
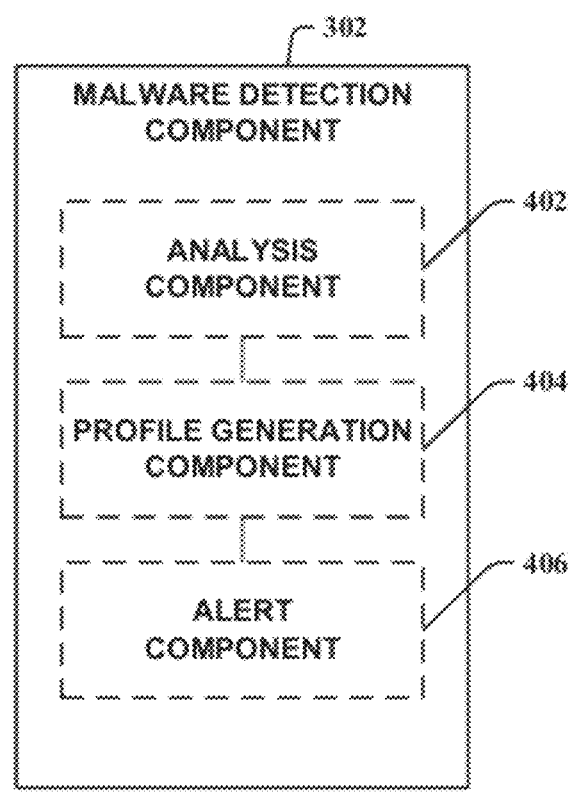
FIG. 4 illustrates an example block diagram of a malware detection component in accordance with aspects described herein.

Turning now to FIG. 4, illustrated is an example block diagram of a malware detection component 302 in accordance with aspects described herein. The malware detection component 302 includes an analysis component 402, a profile generation component 404, and an alert component 406. The analysis component 402 analyzes data in the core network 102 or at the edge of the network 100 where the core network 102 connects to the mobility network 104 (see FIG. 1), and based on the analysis of data traffic and data flows can identify a set of IP addresses that are suspected of being compromised by malware, such as, for example, behaving as bots. In addition, the analysis component can determine if the suspect IP addresses are part of or associated with the mobility network 104 (See FIG. 1).

The analysis component 402 can detect the existence of malware in the network 100 via a plurality of techniques. For instance, the analysis component 402 can start with information related to one or more pieces of malware previously known to be residing in the network 100, and can identify data traffic and data flows that are similar to the data traffic and data flows generated by the known malware. In addition, where the malware includes a botnet or similar software, the analysis component 402 can follow data traffic to a known command and control server (See FIG. 2), and identify bots that attempt to communicate with the known command and control server. Additionally, the analysis component 402 can employ cluster analysis and single out groups of IP addresses that behave in a similar manner that might be indicative of malware, such as scanning the network 100, sending spam messages, etc. Furthermore, the analysis component can detect peer-to-peer botnets in the network 100.

The profile generation component 404 generates a traffic profile of the suspected malware behavior. For example, the profile generation component 404 can generate a profile for a suspected IRC bot that includes transmission of data on a set of IRC ports. The alert component 406 acquires, receives, or otherwise obtains the suspect IP addresses, and associated traffic profiles of the suspect malware behavior from the profile generation component 404. The suspect IP addresses and associated traffic profiles are sent, transmitted, or otherwise communicated to the malware mitigation component (discussed below) by the alert component 406. A timestamp or information relating to a time at which the suspicious behavior occurred can be included or associated with the suspect IP addresses and associated traffic profiles by the alert component 406.

Figure 5:
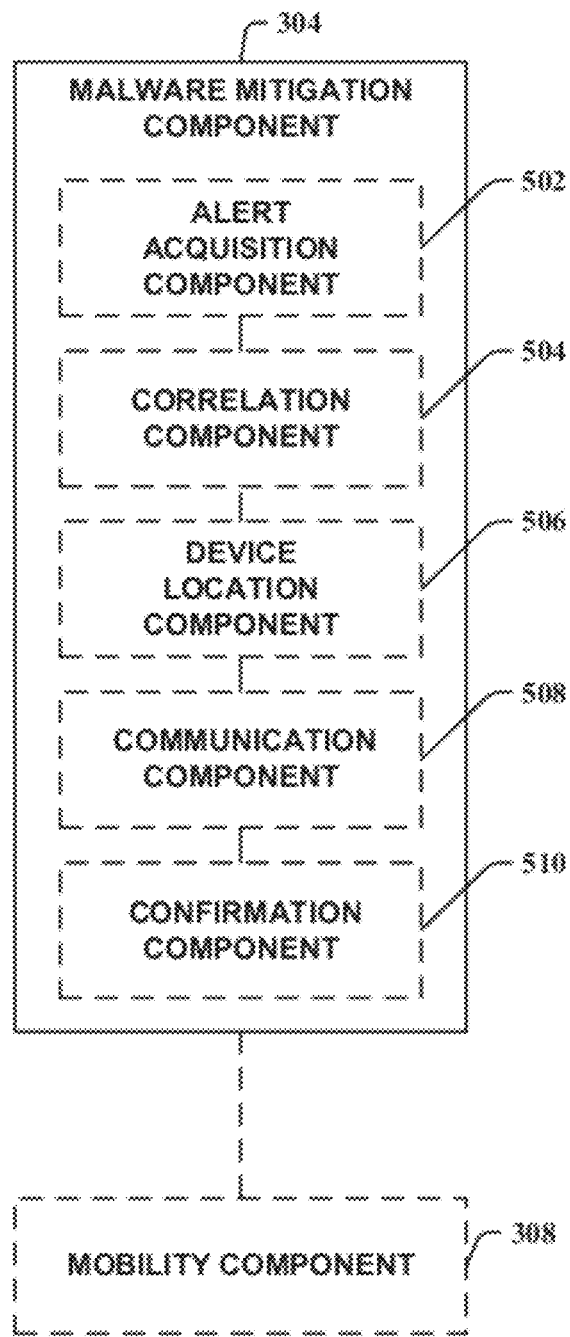
FIG. 5 illustrates an example block diagram of a malware mitigation component in accordance with aspects described herein

Referring to FIG. 5, illustrated is an example block diagram of a malware mitigation component 304 in accordance with aspects described herein. The malware mitigation component 304 includes an alert acquisition component 502, a correlation component 504, a device location component 506, a communication component 508, and a confirmation component 510. The alert acquisition component 502 acquires, receives, or otherwise obtains a suspect IP address, and an associated traffic profile of the suspect malware behavior from the alert component 406 included in the malware detection component 302 (See FIG. 4).

As discussed supra, the malware mitigation component 304 operates, functions, or otherwise executes in the mobility network 104 (See FIG. 1). The functionality of the mobility network 104 can include, but is not limited to, allocating network resources (e.g., IP address, etc.) to mobile devices, handling traffic and signaling between mobile devices and the core network 102, and so forth. The mobility network 104 can include a mobility component 308 that tracks mobility information, such as the IP address, physical location, and so forth of mobile devices operable on the network 100. In addition, the mobility component 308 (e.g., SGSN and GGSN) can maintain a set of logs that link IP addresses assigned to mobile devices during a given time period to the unique IMSI and/or IMEI of the mobile devices. The correlation component 504 can compare the suspect IP address received by the alert acquisition component 502 with the set of logs maintained by the mobility component 308 in order to determine the unique identity (e.g., IMSI or IMEI) of the suspect mobile device. For example, the malware detection component 302 may inspect network traffic or transmit alerts to the malware mitigation component 304 at predetermined intervals (e.g., once an hour). Additionally or alternatively, there may be a time lag between when the suspect activity occurred, and when the suspect IP address and associated traffic profile are obtained by the malware mitigation component 304. As a consequence, it is possible for the malware mitigation component 304 to receive an alert at time T3 regarding an IP address that was engaging in suspicious behavior at time T1. However, the suspect mobile device may have only been assigned the IP address detected by the malware mitigation component 304 from time T1 to T2. Therefore, the correlation component 504 can associate, connect, or otherwise link the suspect IP address to the unique identity (e.g., IMSI or IMEI) of the suspect mobile device for time T1. As mentioned supra, the suspect IP address and associated traffic profile obtained from the malware detection component 302 can include a timestamp, or information relating to a time at which the suspicious behavior occurred.

The device location component 506 can determine a physical location of the suspect mobile device via the mobility component 308. The communication component 508 can send, transmit, or otherwise provide the suspect mobile device with the traffic profile of suspected malware behavior obtained from the malware detection component 302. In addition, the communication component 508 can provide an indication, such as a flag or a bit, to the suspect mobile device to alert the mobile device that it may be infected with malware.

The confirmation component 510 can determine or detect cases in which a time period of a data request by a suspect mobile device is too short, or less than a predetermined duration threshold, to obtain positive device identification. In such situations, the confirmation component 510 can delay sending the traffic profile and/or an indication that the mobile device may be infected with malware until the correlation component 504 determines that the same device has been identified as a suspect mobile device by the malware detection component 302 a second time. For instance, a device may have been assigned a suspect IP address from time T1 to time T2, and the correlation component 504 can determine the IMSI or IMEI of the device based on the mobility logs maintained by the mobility component 308. The confirmation component 510 can determine that the period of time from time T1 to time T2 is less than the predetermined duration threshold desired to obtain positive identification of the suspect mobile device. As a result, the confirmation component 510 can hold off sending the traffic profile and/or an indication to the mobile device until the IMSI or IMEI of the mobile device is again determined by the correlation component 504 to be linked to an IP address that is suspected of malware infection. Alternatively, the confirmation component 510 can determine not to hold off sending the traffic profile and/or an indication.

FIG. 6 illustrates an example mobility log 602 in accordance with aspects described herein. The term mobility log as used herein refers to the logging of, or otherwise maintaining, information about activities of a corresponding device. In this example, the mobility log 602 chronicles, tracks, or otherwise maintains information for each outgoing data request from a mobile device. The mobility log can include, but is not limited to, an IP address 604 that is selectively assigned to the data request by the mobility network (e.g., GGSN or SGSN) 104, a start time 606 for each request, an end time 608 for which the assigned IP address 604 was valid, and a device identification 610, such as an IMSI or an IMEI of the device generating the request. For instance, example record (row) 612 illustrates that a mobile device was assigned IP1 for a data request that started at time T1, and that IP1 was valid for the mobile device until time T2. In addition, an identification of the mobile device, such as the IMSI or IMEI is recorded for each data request.

As discussed supra, a malware detection component (See FIG. 4) can analyze virtually all data flows in a wireless communication network and identify, recognize, or otherwise detect a set of IP addresses suspected of engaging in behavior indicative of a malware infection. The malware detection component can provide suspect IP addresses and associated traffic profiles of the suspected behavior to the malware mitigation component (See FIG. 5). In the illustrated embodiment, the mapping between the IP address and the suspect mobile device is not a one-to-one mapping. Rather, the IP addresses 604 for each data request can be selectively assigned in a virtually random manner by the mobility network 104. The malware mitigation component 304 can compare a suspect IP address received from the malware detection component with the mobility logs 602 maintained by the mobility component 308 in order to determine the unique identity (e.g., IMSI or IMEI) of a suspect mobile device.

Figure 7:
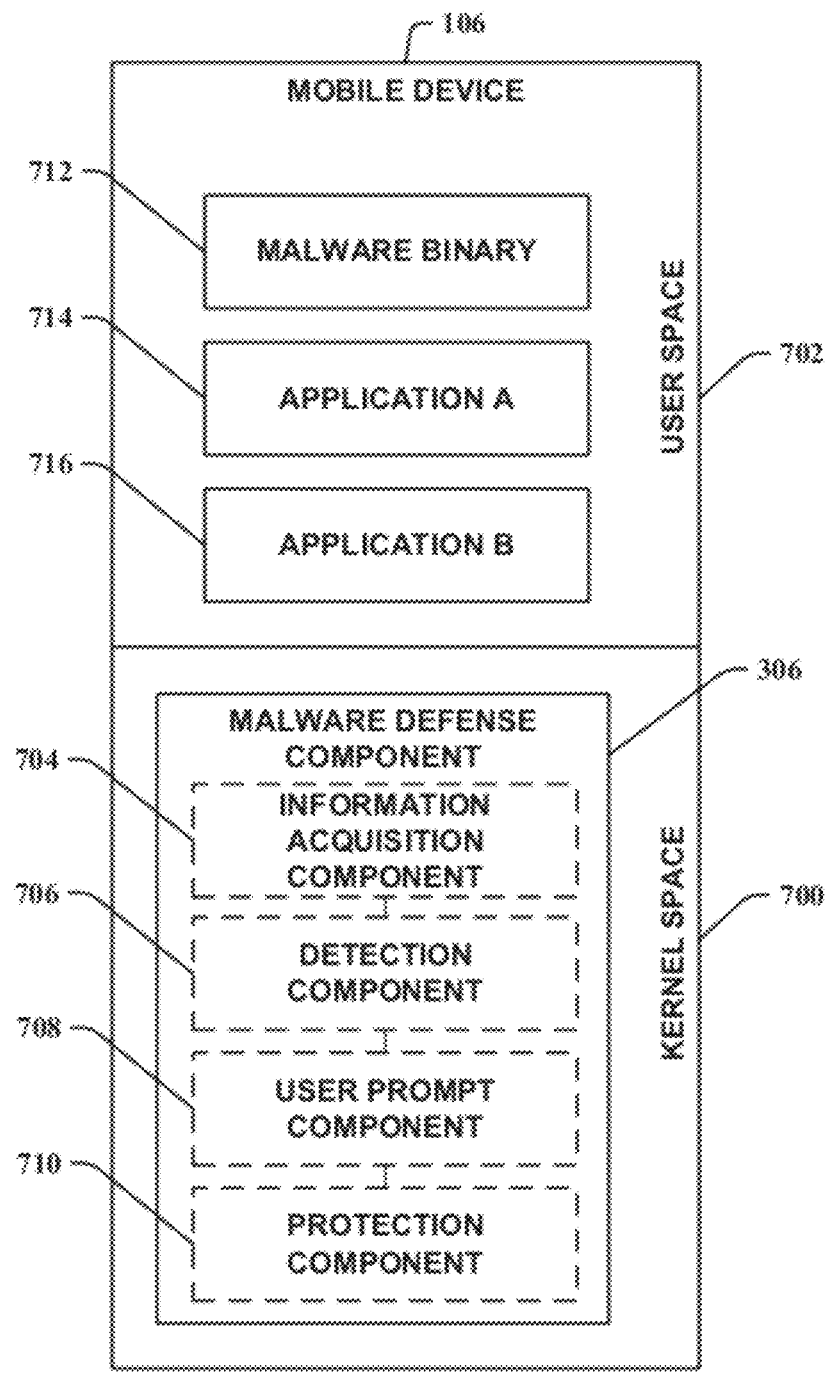
FIG. 7 illustrates an example block diagram of a mobile communication device in accordance with aspects described herein.

FIG. 7 illustrates an example block diagram of a mobile device 106 in accordance with aspects described herein. As discussed supra, the mobile device 106 can include, but is not limited to, tablet computers, smart phones, mobile phones, netbooks, portable music players, personal digital assistants (PDAs), laptops, electronic book devices (e-book readers), global positioning systems (GPS), and so forth. Typically, the operating resources of mobile devices 106 can be broadly separated into kernel space 700 and user space 702. The kernel space 700 operates as a bridge between a set of applications 712-716 that execute, perform, or otherwise operate in the user space 702 and data processing performed by the hardware (not shown) of the mobile device 106. As a consequence, virtually all data traffic on the mobile device 106 can be observed from the kernel space 700. Therefore, it may be desirable for the malware defense component 306 to reside, operate, or otherwise execute in the kernel space 700 of the mobile device 106. Additionally or alternatively, the malware defense component 306 can reside in a trusted virtual machine when the mobile device 106 uses a virtualization platform.

The malware defense component 306 includes an information acquisition component 704, a detection component 706, a user prompt component 708, and a protection component 710. The information acquisition component 704 acquires, receives, or otherwise obtains a traffic profile of suspected malware that may be infecting the mobile device 106. For instance, the suspected malware can cause the mobile device 106 to behave as a bot (See FIG. 2). In addition, the information acquisition component can obtain a flag or bit that serves to notify the malware defense component 306 that the mobile device 106 is suspected of being infected with malware. It is to be appreciated that the flag or bit can be included in or associated with the traffic profile. The detection component 706 can intercept, observe, or otherwise inspect virtually all data traffic generated on the mobile device 106, and can correlate the data traffic with the traffic profile to determine at least one application or binary responsible for generating the suspect traffic profile. Returning to an earlier example, the traffic profile for an IRC bot can include generating traffic on a particular set of IRC ports. The detection component 706 can observe virtually all the data traffic on the mobile device and determine which of the applications and binaries 712-716 is generating traffic on the particular set of IRC ports. For instance, the detection component 706 can determine that the malware binary 712 is generating the traffic on the particular IRC ports, and determine that the malware binary 712 is malware.

The user prompt component 708 can inform the user via an onscreen display, or other appropriate means, that the malware has been detected on the mobile device 106, and for example, that the infected application, malware binary 712, is behaving as a bot. The user prompt 708 can prompt the user to remove the infected application or ignore the warning. If the user decides to remove the infected application then the protection component 710 deletes, erases, or otherwise removes the infected application from the mobile device 106. The protection component 710 can perform additional mitigating actions if the user decides to ignore the warning, including but not limited to automatically dropping packets from the suspect application, quarantining the suspect application, or blocking user access to the suspect application. A decision to perform such additional mitigating actions can be based at least in part on a determination that the additional mitigating actions are required to protect the user and/or the wireless networks from aggressive malware attacks. Additionally or alternatively, the protection component 710 can delete, erase, or otherwise remove the suspect application or binary without prompting the user. For example, a default option or a predetermined preference may instruct the malware defense component 306 to automatically remove any suspect applications or binaries. It is to be appreciated that the mobile device 106, can include a virtually infinite number of applications, and a plurality of the applications may be malware.

Figure 8:
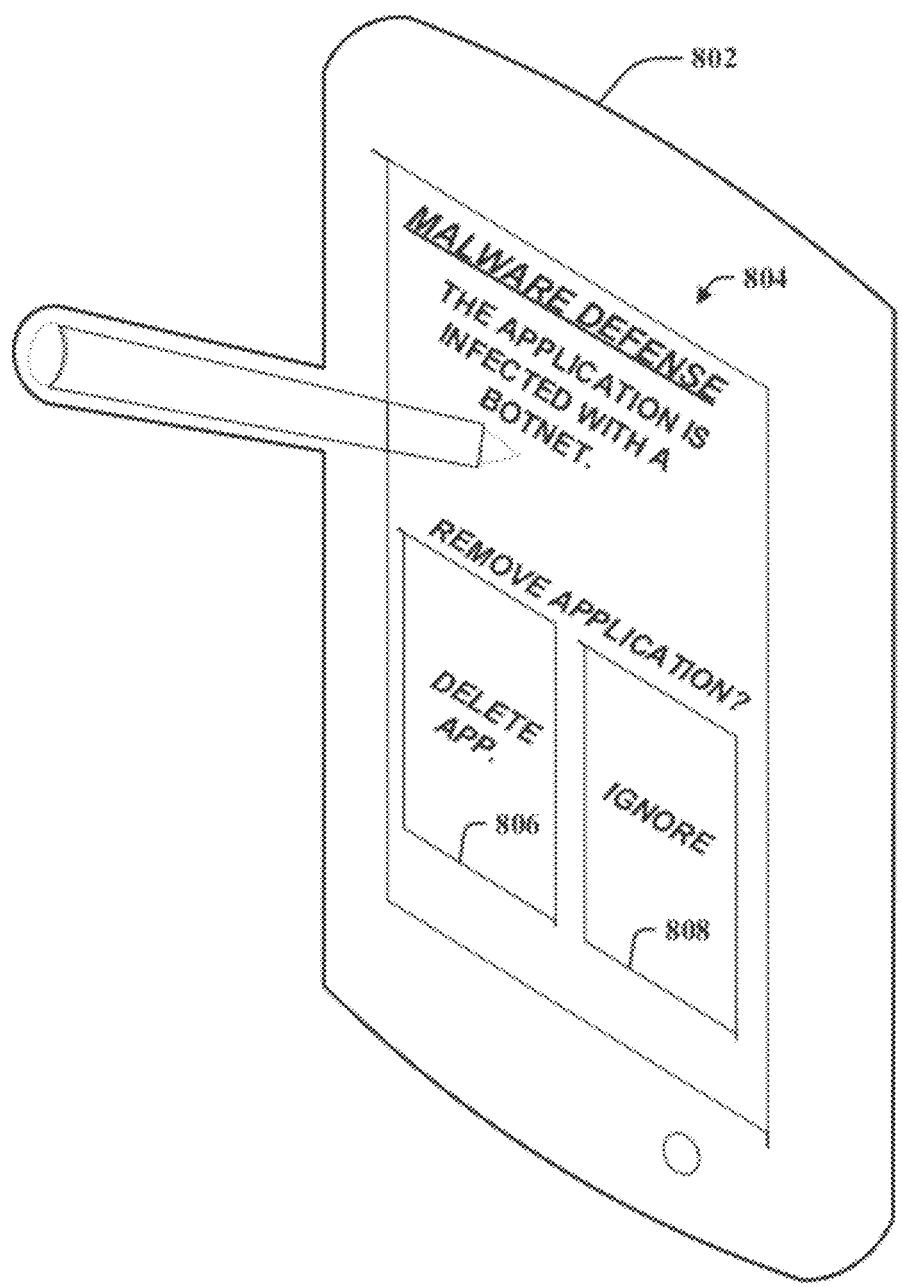
FIG. 8 illustrates an example user prompt for the malware mitigation system in accordance with aspects described herein

Turning now to FIG. 8, illustrated is an example user prompt for a mobile malware mitigation system in accordance with aspects described herein. A mobile device 802 is shown as a touch screen device, such as a tablet pc, smart phone, etc. However, as discussed previously, the mobile device can include, but is not limited to, mobile phones, net books, portable music players, personal digital assistants (PDAs), laptops, electronic book devices (e-readers), global positioning systems (GPS), and so forth.

As discussed supra, the mobile device 802 will receive, obtain, or otherwise acquire information regarding a traffic profile of an application or binary that is suspected of behaving as a malware and infecting the mobile device. A malware defense component (See FIG. 7) can correlate the traffic profile to the data traffic on the mobile device 802, and determine the specific application or binary responsible for generating the suspect traffic profile. Once the responsible application has been determined, a message 804 can be displayed to the user that malware has been detected on the device, and the user can be prompted to delete the application (app) or binary 806 or ignore 808 the warning.

The user can choose either the delete app option 806 or ignore option 808, by a plurality of means including, but not limited to, touching, clicking, orally commanding, or otherwise selecting the appropriate choice. If the user selects the delete app option 806, then the malware defense component will erase, remove, or otherwise delete the suspect application from the mobile device 802. Conversely, if the user selects the ignore option 808, then the suspect application may remain on the mobile device 802, or the malware defense component can perform additional mitigating actions, including but not limited to automatically dropping packets from the suspect application, quarantining the suspect application, or blocking user access to the suspect application. A decision to perform such additional mitigating actions can be based at least in part on a determination that the additional mitigating actions would be beneficial to protect the user and/or the wireless networks from aggressive malware attacks. It is to be appreciated that the foregoing is merely an example illustration set forth for simplicity of explanation, and those reasonably skilled in the art will be able to identify a plurality of user prompts and/or additional mitigating actions that are within the scope of the subject disclosure.

In view of the example systems described supra, methods that may be implemented in accordance with the disclosed subject matter may be better appreciated with reference to the flow charts of FIGS. 9-12. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 9:
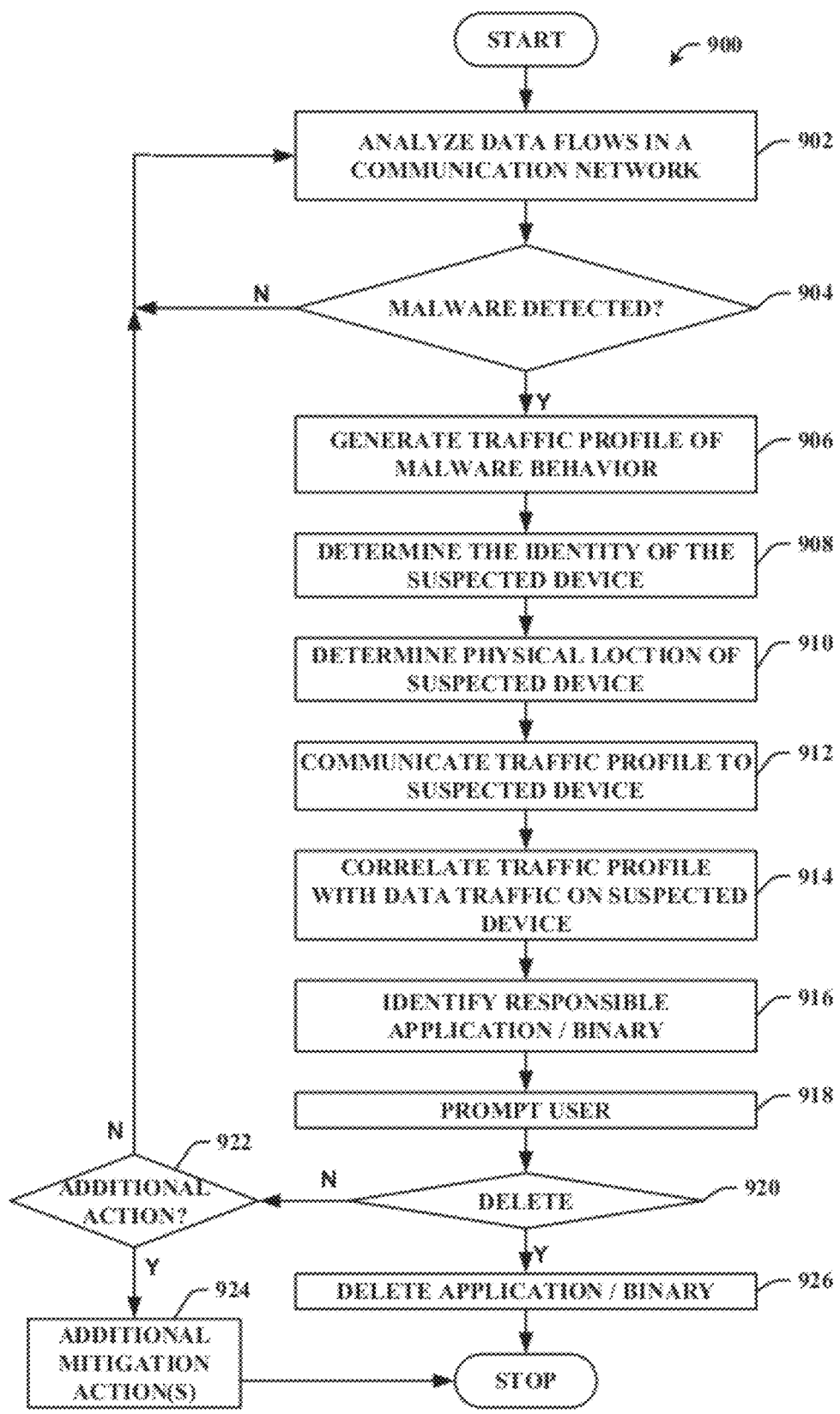
FIGS. 9-12 are flow diagrams of respective methods for malware mitigation in a wireless communication system.

Turning now to FIG. 9, an example methodology for malware mitigation in wireless networks is illustrated in accordance with aspects described herein. Methodology 900 can begin at block 902, wherein data flows and data flow patterns throughout a network are analyzed. At 904, a determination is made whether an IP address suspected of behaving as malware has been detected in the network based on the analysis of the data flows and data flow patterns. If an IP address suspected of behaving as malware has not been detected then the methodology returns to 902 (N at 904). If a device suspected of exhibiting malware behavior has been detected (Y at 904), then at 906 a traffic profile of the malware is generated. For example, malware can include botnets, and typical bot behavior can include transmitting spam messages, scanning the network, and/or generating traffic anomalies.

At 908, the identity (e.g., IMSI or IMEI) of the suspect device can be determined by leveraging the logging mechanisms available within the core mobility network elements based on the time period of the suspect behavior. For instance, the logging mechanisms can include a set of mobility logs that can be compared with the suspect IP address to determine the identity of the device assigned the suspect IP address at the time of the suspect behavior. At 910, the physical location of the compromised device is determined, and at 912 the traffic profile of the suspect malware behavior is sent, transmitted, or otherwise provided to the suspect device.

At 914, the traffic profile is correlated with data traffic on the suspect device, and at 916 the application/binary responsible for generating the suspect traffic profile is identified based on the correlation of the data traffic with the traffic profile at 914. For example, if the suspect malware is an IRC bot, then the traffic profile of the bot can include sending traffic on a specific IRC port, and it can be determined which application/binary is sending traffic on the specific IRC port.

At 918, a prompt can be displayed to the user informing the user that an application/binary on the device is behaving as a malware. The prompt can include options to delete the application/binary or ignore the warning. At 920, a determination is made whether the user has elected to delete the suspect application. If the user elects to ignore the warning or not delete the suspect application/binary (N at 920), then at 922 a determination is made whether additional action should be taken, the determination can be based at least in part on a decision that additional action is required to protect the user and/or the wireless networks from aggressive malware attacks. If it is determined that additional action is not required (N at 922), then the methodology 900 can return to 902. If it is determined that additional action is required (Y at 922), then at 924 additional mitigation actions can be performed, including but not limited to automatically dropping packets from the suspect application/binary, quarantining the suspect application/binary, or blocking user access to the suspect application/binary. If the user elects to delete the suspect application/binary (Y at 920), then at 926 the application/binary is removed from the device.

Figure 10:
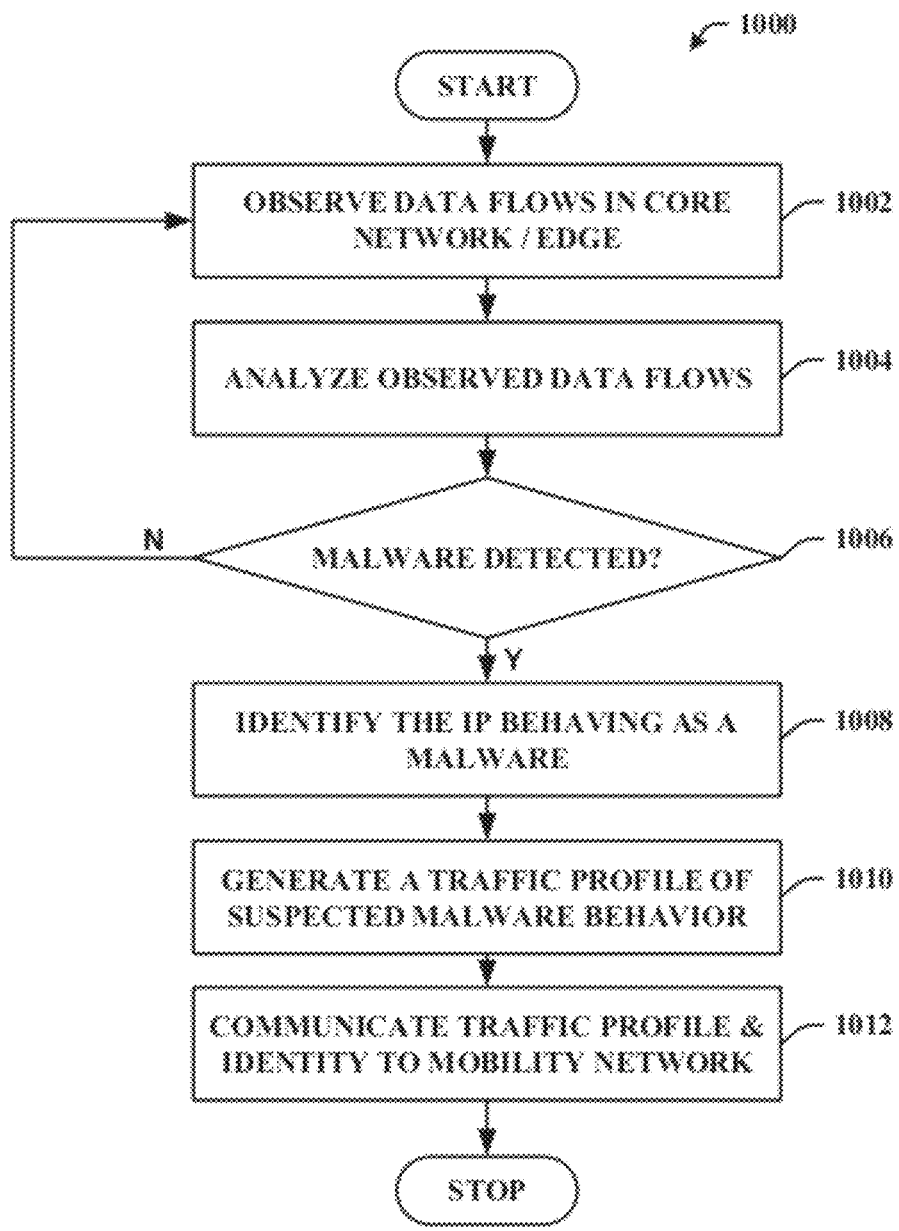

Referring to FIG. 10, an example methodology for malware detection is illustrated in accordance with various aspects described herein. Methodology 1000 can begin at block 1002, wherein the data flows and data traffic for a network are observed from the core network or an edge of the network where the core network and a mobility network are communicatively coupled. At 1004, the observed data flows and data traffic are analyzed to determine if there are IP addresses in the network behaving as malware or in manner that is suspected of being caused by malware. A plurality of techniques can be employed to determine suspect behavior. For instance, the analysis can be based on one or more known pieces of malware in the network, and can identify data traffic and data flows that are similar to the data traffic and data flows generated by the known malware. Additionally or alternatively, where the malware is a botnet, analysis can include following data traffic to a known command and control server (See FIG. 2), and identifying bots that attempt to communicate with the known command and control server. Additionally or alternatively, analysis can include employing cluster analysis, and singling out groups of IP addresses that behave in a similar manner that might be indicative of a bot. Such behavior can include scanning the network, sending out spam messages, and so forth.

At 1006, a determination is made whether an IP address suspected of malware behavior has been detected. If an IP address suspected of exhibiting malware behavior has not been detected (N at 1006), then the methodology 1000 can return to 1002. If an IP address suspected of exhibiting malware behavior has been detected (Y at 1006), then at 1008 the suspect IP address is identified. At 1010, a traffic profile of the suspected malware behavior can be generated. For example, if suspected malware behavior is of an IRC bot, then the traffic profile can include transmitting data on a particular set of IRC ports. As additional or alternative examples, the traffic profile can include generating spam messages, scanning the network, or virtually any malicious activity. The traffic profile can include a time stamp or information regarding a time of the suspect behavior. At 1012, the traffic profile and the suspect IP address are communicated to the mobility network.

Figure 11:
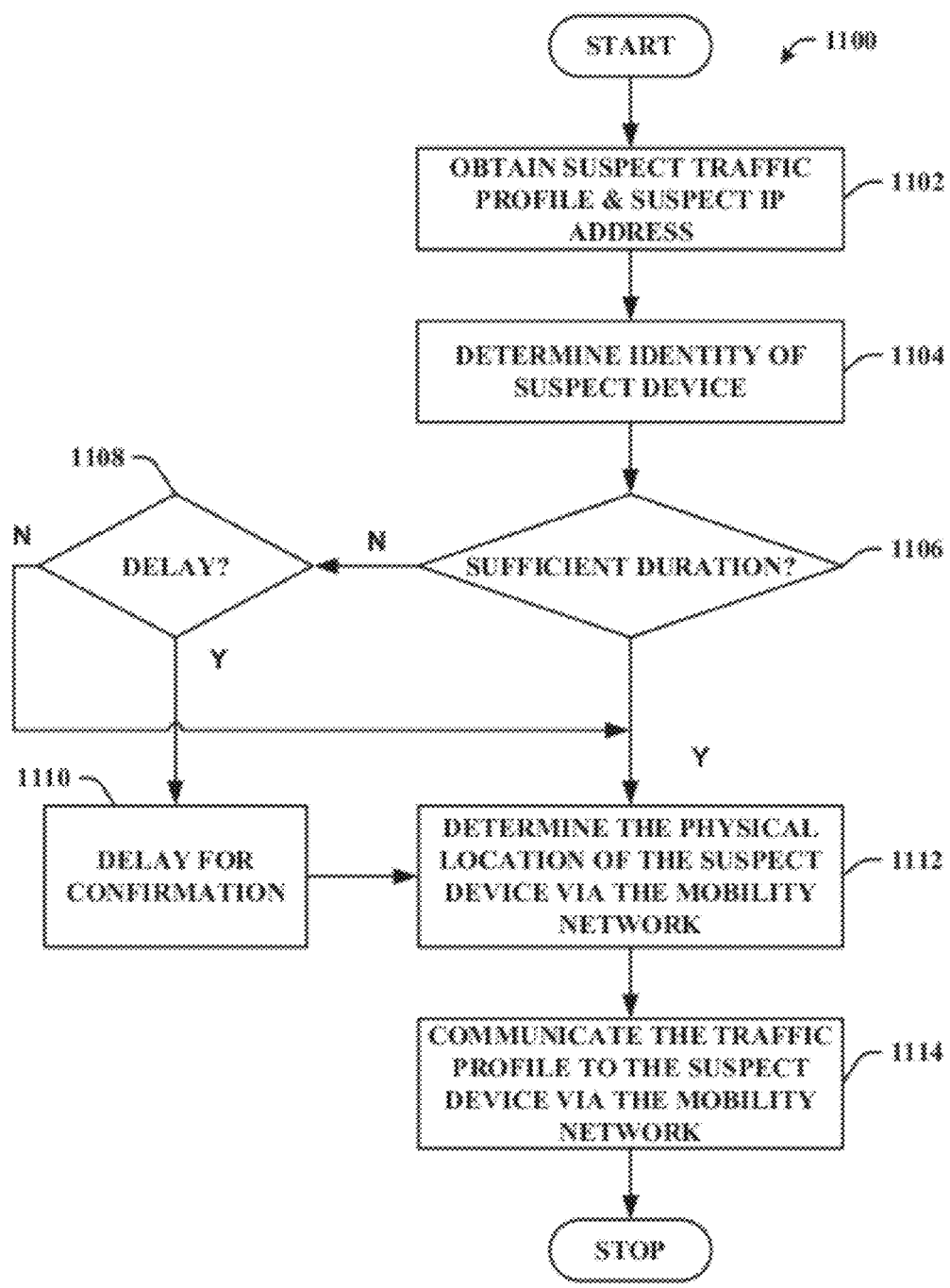

Turning now to FIG. 11, an example methodology of malware mitigation is illustrated in accordance with various aspects described herein. Methodology 1100 can begin at block 1102, wherein a traffic profile and an IP address that is suspected of engaging in malware behavior is received, acquired, or otherwise obtained. At 1104, the identity (e.g., IMSI or IMEI) of a suspect mobile device can be determined by comparing the suspect IP address with a set of mobility logs maintained by the core mobility network elements. For example, the network can be inspected for malware or transmit alerts regarding suspect IP address at predetermined intervals (e.g., once an hour). Additionally or alternatively, there may be a time lag between when the suspect activity occurred, and when the suspect IP address and associated traffic profile are obtained. As a consequence, the suspect IP addresses may be received at time T3 regarding a mobile device that was engaging in suspicious behavior at time T1. However, the suspect mobile device may have only been assigned the suspect IP address from time T1 to time T2. Therefore, at 1104 the suspect IP address and the mobility logs can be compared to determine the identity of the suspect device.

At 1106, a determination is made whether the duration of the data request linking the suspect IP address to a possible suspect device is sufficient to obtain positive device identification. For example, a device may have been assigned a suspect IP address from time T1 to time T2, and a determination can be made whether the period of time from time T1 to time T2 is greater than or equal to a predetermined duration threshold. If the duration of the data request linking the suspect IP address to a possible suspect device is not sufficient to obtain positive device identification (N at 1106), then at 1108 a determination is made whether to delay sending the traffic profile and/or an indication to the possible suspect mobile device. The determination to delay sending the traffic profile and/or an indication to the possible suspect mobile device can be based on any of a plurality of factors. For example, a network administrator can determine to delay sending some, all, or none of the traffic profiles and/or indications to possible suspect mobile devices. Additionally or alternatively, the determination to delay sending the traffic profile and/or an indication can be based on one or more attributes of the traffic profile. If it is determined to delay sending the traffic profile and/or an indication to the possible suspect mobile device (Y at 1108), then at 1110 the traffic profile and/or the indication will be delayed for confirmation. For example, the traffic profile and/or the indication can be delayed until the identity (e.g., IMEI or IMSI) of the device is again linked to a suspect IP address.

If it is determined not to delay sending the traffic profile and/or an indication to the possible suspect mobile device (N at 1108), then the methodology can proceed to 1112 and a physical location of the mobile device can be determined via the mobility network. As discussed supra, the functionality of the mobility network can include, but is not limited to, allocating network resources to mobile devices, handling traffic and signaling between the mobile devices and the core network, and so forth. In addition, if the wireless network is a 2G or a 3G network, it can include a serving GPRS support node (SGSN) and a gateway GPRS support node (GGSN). The responsibilities of the SGSN can include, but are not limited to, delivery of data packets to and from wireless devices within its geographical service area, packet routing and transfer, and authentication and charging functions. The GGSN 312 can be responsible for maintaining current location information for the wireless device, and maintaining routing data necessary to tunnel data to the SGSN 310 that services the particular wireless device. Therefore, it can be appreciated how the determining the physical location of the suspect mobile device is accomplished via the mobility network.

If the duration of the data request linking the suspect IP address to a possible suspect device is sufficient (e.g., greater than or equal to the predetermined duration threshold) to obtain a positive device identification (Y at 1106), then the methodology can proceed to 1112 and a physical location of the mobile device can be determined. At 1114, the traffic profile is communicated to the suspect mobile device via the mobility network. As discussed supra, if the suspected malware is an IRC bot, then the traffic profile can include transmitting data on a particular set of IRC ports. As additional or alternative examples, the traffic profile can include generating spam messages, scanning the network, or virtually any malicious activity. Additionally, a warning flag or bit indicating (e.g., indication) that an application or binary that is acting as a bot is present on the mobile device can be communicated to the mobile device.

Figure 12:
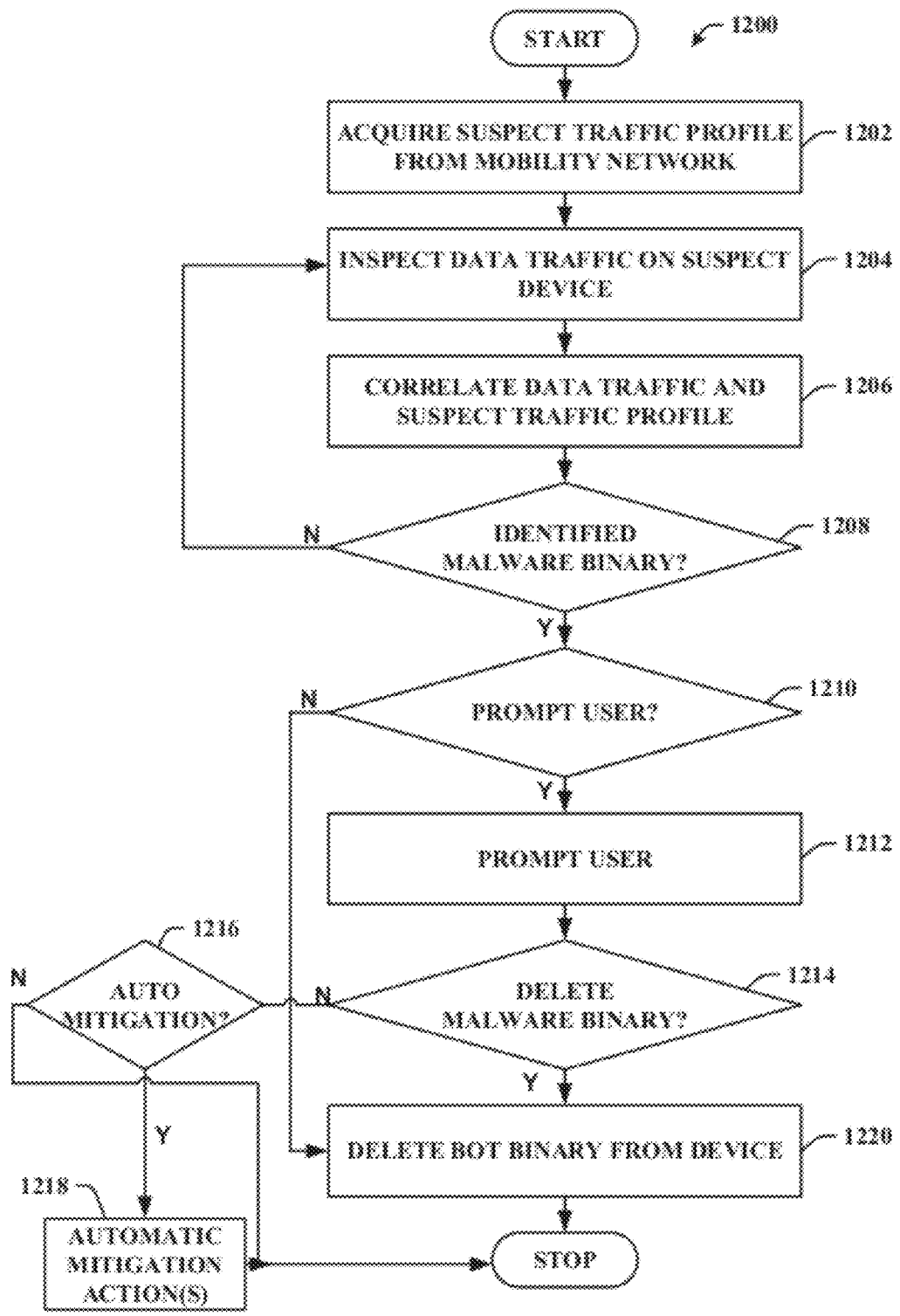

Turning now to FIG. 12, an example methodology of malware mitigation on a mobile device is illustrated in accordance with aspects described herein. Methodology 1200 can begin at block 1202, wherein a suspect traffic profile is obtained, received, or otherwise acquired from a mobility network. The suspect traffic profile can include information relating to suspect malware behavior that is occurring on the mobile device. In addition, a flag or bit indicating that the mobile device may be infected by malware can be associated with the suspect traffic profile.

At 1204, the data traffic on the mobile device is inspected, and at 1206 the data traffic on the mobile device is correlated, compared, or otherwise analyzed against the suspect traffic profile. For example, if the suspect traffic profile is of an IRC bot, then the traffic profile can be compared with the data traffic on the mobile device to determine if any applications or binaries are generating traffic on a suspected set of IRC ports.

At 1208, a determination is made as to whether a binary (or application) matching the traffic profile has been identified? If a binary matching the traffic profile has not been identified (N at 1208), then the methodology 1200 returns to the 1204, and continues inspecting data traffic on the mobile device. If a binary matching the traffic profile has been identified (Y at 1208), then at 1210 a determination is made whether to prompt the user regarding the suspect binary. The determination of whether to prompt the user can be a default setting or predetermined preference, wherein the methodology always, never, or on the occurrence of a predetermined condition prompts the user to remove the malware. If the determination is made to prompt the user (Y at 1210), then at 1212 the user is prompted via an onscreen display, or other appropriate means, that malware has been detected on the phone. At 1214, a determination is made by the user whether to delete the suspect binary. If the determination is made by the user not to delete the suspect binary (N at 1214), then at 1216 a determination is made whether automatic mitigation should be performed, the determination for automatic mitigation can be based at least in part on a decision that mitigation action is required to protect the user and/or the wireless networks from aggressive malware attacks. For example, the traffic profile obtained by the mobile device can include a warning or specification that additional action may be required to protect the user and/or wireless networks if the user elects not to remove the suspect binary. If it is determined that automatic mitigation is not required (N at 1216), then the methodology 1200 can terminate. If it is determined that automatic mitigation actions should be performed (Y at 1216), then at 1218 automatic mitigation actions can be performed, including but not limited to automatically dropping packets from the suspect binary, quarantining the suspect binary, or blocking user access to the suspect binary.

If the determination is made to delete the suspect binary (Y at 1214), then at 1220 the suspect binary is erased, deleted, or otherwise removed from the mobile device. Returning to 1212, if it is determined to not prompt the user (N at 1210), then the methodology proceeds to 1220, wherein the suspect binary is erased, deleted, or otherwise removed from the mobile device.

Figure 13:
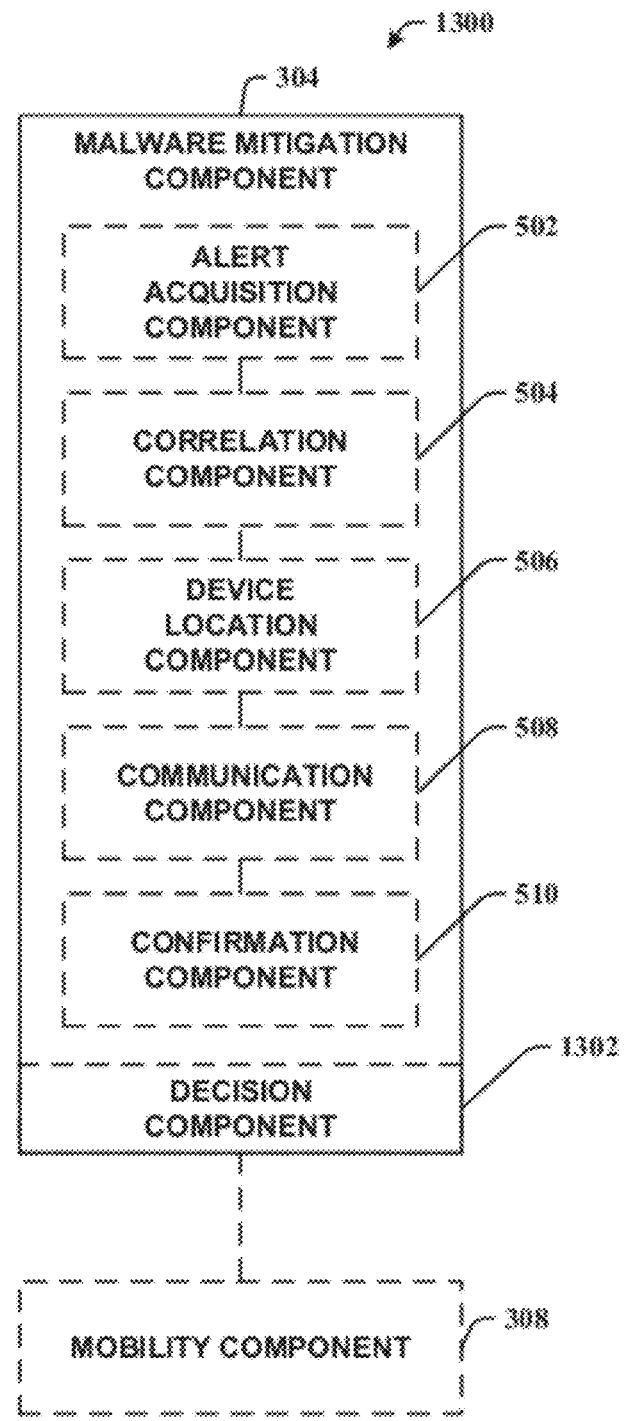
FIG. 13 illustrates an example block diagram of a system that employs an artificial intelligence component which facilitates automating one or more features in accordance with aspects described herein.

FIG. 13 illustrates a system 1300 that employs a decision component 1302 which facilitates automating one or more features in accordance with aspects described herein. Various embodiments (e.g., in connection with inferring) can employ various decision facilitating schemes for carrying out various aspects thereof. For example, a process for correlating a suspect IP address with a device identification (e.g., IMSI or IMEI), or confirming the identity of possible suspect device can be facilitated via an automatic classifier system and process.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Furthermore, inference can be based upon logical models or rules, whereby relationships between components or data are determined by an analysis of the data and drawing conclusions there from. For instance, by observing that one user interacts with a subset of other users over a network, it may be determined or inferred that this subset of users belongs to a desired social network of interest for the one user as opposed to a plurality of other users who are never or rarely interacted with.

Figure 14:
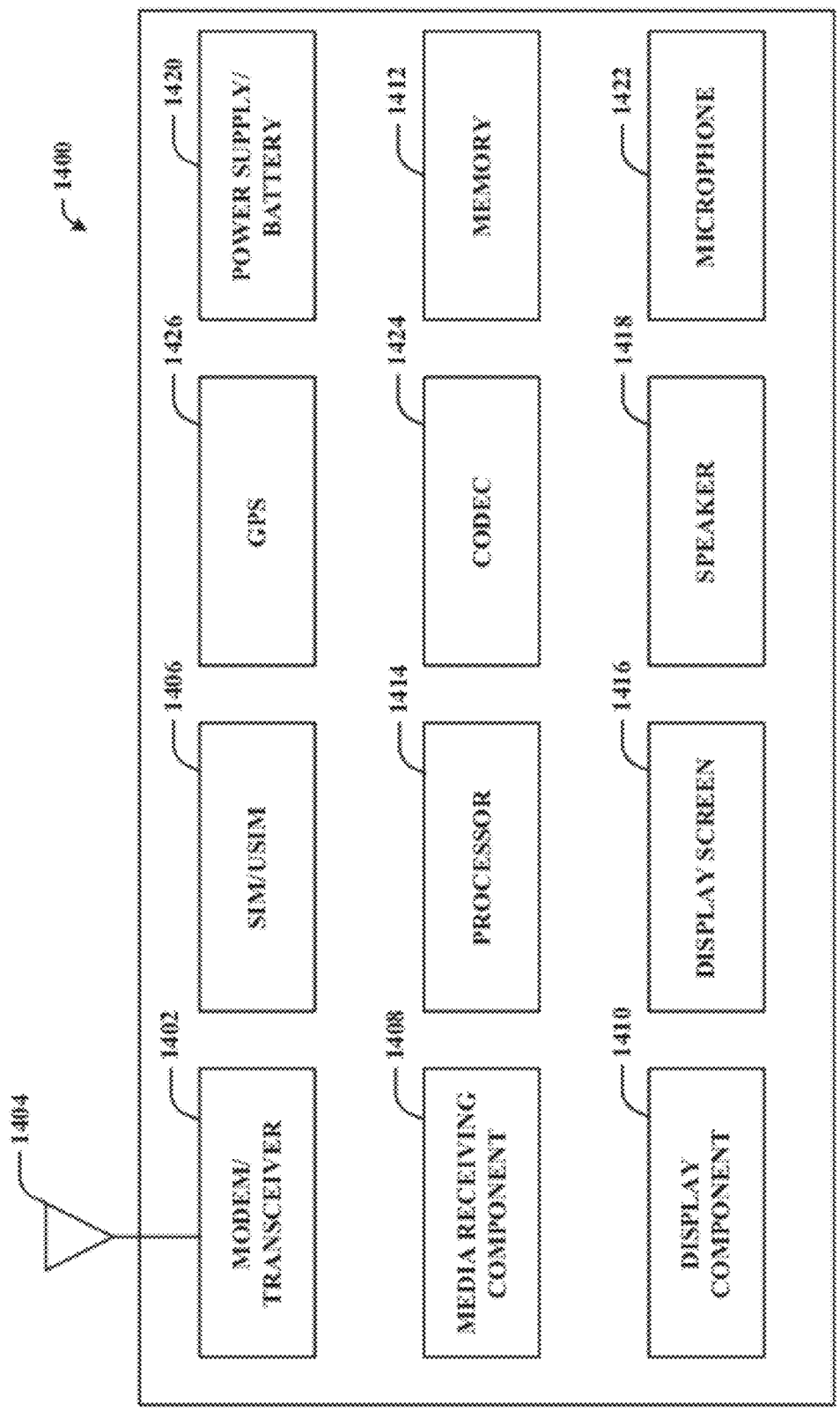
FIGS. 14-17 illustrate example systems that can be employed with various aspects described herein.

FIG. 14 illustrates an additional or alternative example aspect of a wireless system that can implement features and aspects described herein and operated in accordance with such features and aspects. The example system 1400 can include a modem 1402 that can wirelessly communicate with a wide area network, for example, employing a 2G/3G/3.5G/4G wireless connection. As an example, the modem 1402 can be a wireless wide area network (WWAN) modem/transceiver such as a GPRS/EDGE/CDMA/UMTS/HSPA/LTE modem that can transfer digital images (or other media files) and/or control data. Moreover, the modem 1402 can operate in any of the commonly used wireless spectrum bands. As an example, the modem 1402 can be IPv6 (Internet Protocol version 6) enabled. It can be appreciated that the modem 1402 can be embedded in the system 1400 or external to the system and can be connected to an antenna 1404 to receive and/or transmit data. The antenna 1404 can be external or internal. Moreover, the modem 1402 can receive instructions sent by a remote user (e.g. system subscriber) over a network, e.g., a mobile network platform that serves a network of deployed access points, to change one or more settings and/or perform one or more functions on the example system 1400, for example, load, delete or play a file.

Furthermore, the modem 1402 can also be configured to receive wireless alerts (SMS, Image)/broadcast from a mobile network platform. Additionally, the example system 1400 of a can include a SIM (Subscriber Identity Module) or USIM (Universal Subscriber Identity Module) 1406 associated with the system users account subscription. The SIM or USIM 1406 can be prepaid, flat rate monthly, or usage based. Further, the SIM or USIM 1406 may need to be a locked to the specific type of device (e.g., a wireless digital media that employs a WWAN modem) to prevent it from being used in a mobile phone or wireless data device to prevent network abuse if lower rates, including flat rate, are offered to the system subscribers.

A media receiving component 1408 can receive media files, e.g., content(s), sent to the example system 1400 through an access point via the modem 1402. Received media files can be displayed through display component 1410. The modem 1402 can include control functions to enable communication with the WWAN and transfer of data in the downlink. The modem 1402 can be downlink enabled and can optionally allow the ability to transfer data in the uplink (UL) direction beyond control channels. For example, the system 1400 can transfer data associated with available free space in memory 1412 to a mobile network platform in the UL. Further, the modem 1402 can be configured to allow network control such that transfer of data could occur at various times of the day based on network/sector loading due to traffic and propagation conditions and/or based on user preferences. Further, the modem 1402 can be configured to work on a prepaid condition or active account or unlimited usage account.

The system 1400 can typically include a processor 1414 that can be a processor based controller chip. Specifically, the processor 1414 can be a processor dedicated to analyzing information received by modem 1402 and/or generating information for transmission on the UL, a processor that controls one or more components of the system 1400, a processor that facilitates output of media files on a display screen 1416 or via speaker 1418, and/or a processor that both analyzes information received by modem 1402, generates information for transmission on the UL, controls one or more components of the system 1400 and facilitates output of media files on a display screen 1416 or via speaker 1418.

The system 1400 can additionally comprise memory 1412 that is operatively coupled to processor 1414 and that can store data to be transmitted, received data, data associated with analyzed signal and/or interference strength, information related to an assigned channel, power, rate, or the like, and any other suitable information for estimating a channel and communicating via the channel. Memory 1412 can additionally store media files received from a sender over a network. Further, memory 1412 can also store user preferences and/or predefined user settings. In one example, memory 1412 can be partitioned, such that locally downloaded media files (e.g. downloaded by an end user) are stored in one partition and remotely downloaded media files (e.g., content (s) are stored in another partition. A number of program modules can be stored in the memory 1412, including an operating system, one or more application programs, other program modules and/or program data. It is appreciated that the aspects described herein can be implemented with various commercially available operating systems or combinations of operating systems.

Additionally, a system bus (not shown) can be employed to couple system components including, but not limited to, the system memory 1412 to the processor 1414. The system bus can be any of several types of bus structure that may further interconnect to a memory bus (with or without a memory controller), a peripheral bus, and a local bus using any of a variety of commercially available bus architectures.

The media files received from the mobile wireless network can be displayed on the display screen 1416 and/or audio files can be played via the speaker 1418. It can be appreciated that the media files stored in the memory 1412 can also be received via ports such as, but not limited to, USB, USB2, 1495, SD card, Compact Flash, etc. Additionally, system 1400 can include a power supply/battery 1420 that can be employed to power the system. As an example, power management techniques can be employed to save battery power, such that the battery can last longer between recharge cycles.

An end user can enter commands and information through one or more wired/wireless input devices, e.g., a keyboard, a pointing device, such as a mouse and/or a touch screen display 1416. A microphone 1422 can also be employed to enter data. For example, the end user can employ the microphone 1422 to enter an audio clip associated with an image. These and other input devices are often connected to the processor 1414 through an input device interface (not shown) that is coupled to a system bus, but can be connected by other interfaces, such as a parallel port, an IEEE 1494 serial port, a game port, a USB port, an IR interface, and so forth.

The system 1400 can further include a codec 1424 that can be employed encode and/or decode digital data. The codec 1424 can employ most any compression and/or decompression algorithm to compress/decompress a received media file. Furthermore, the system 1400 can include a GPS (global positioning system) 1426 that can be employed to determine the current geographical coordinates of the example the system 1400. The GPS 1426 can include a separate GPS antenna (not shown) or employ the antenna 1404 to communicate with a GPS satellite. In one example, the example system 1400 can receive broadcast warnings, emergency alerts, weather alerts, etc. based on the current coordinates.

In addition, the example system 1400 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 15:
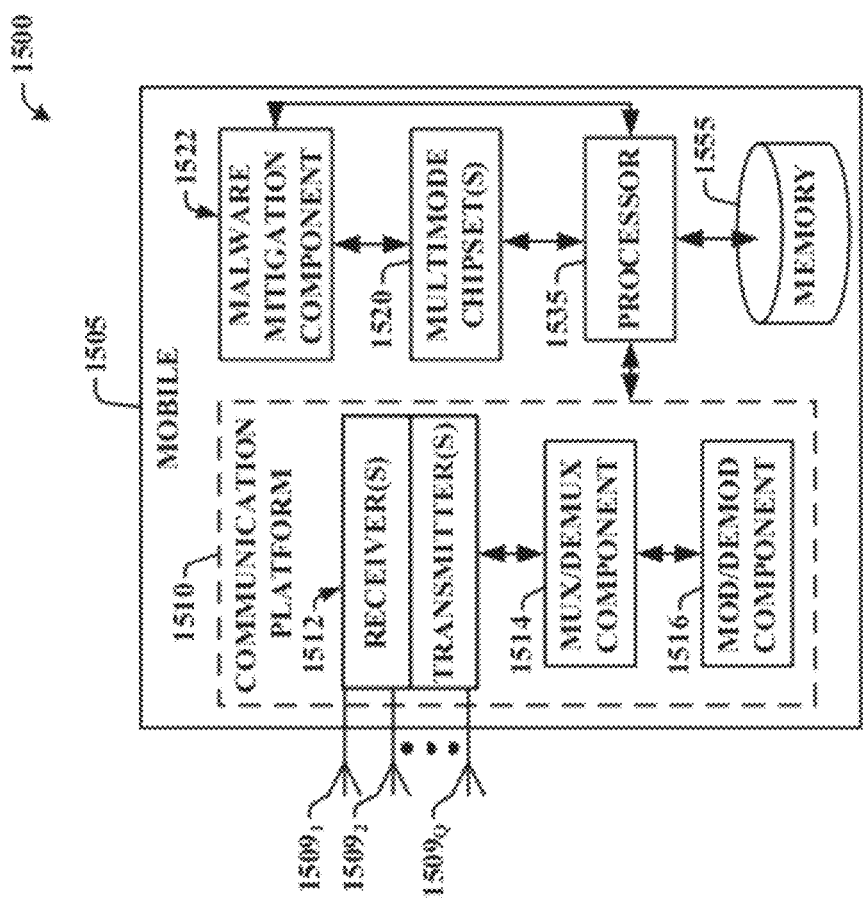
Figure 16:
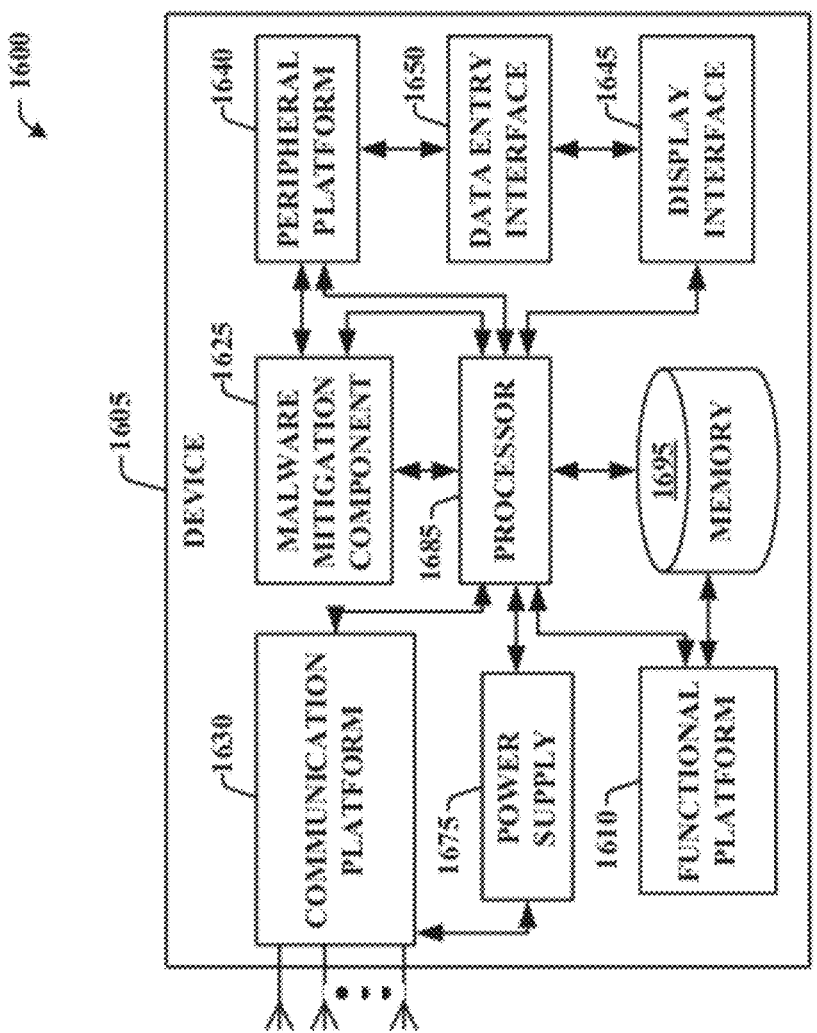
Figure 17:
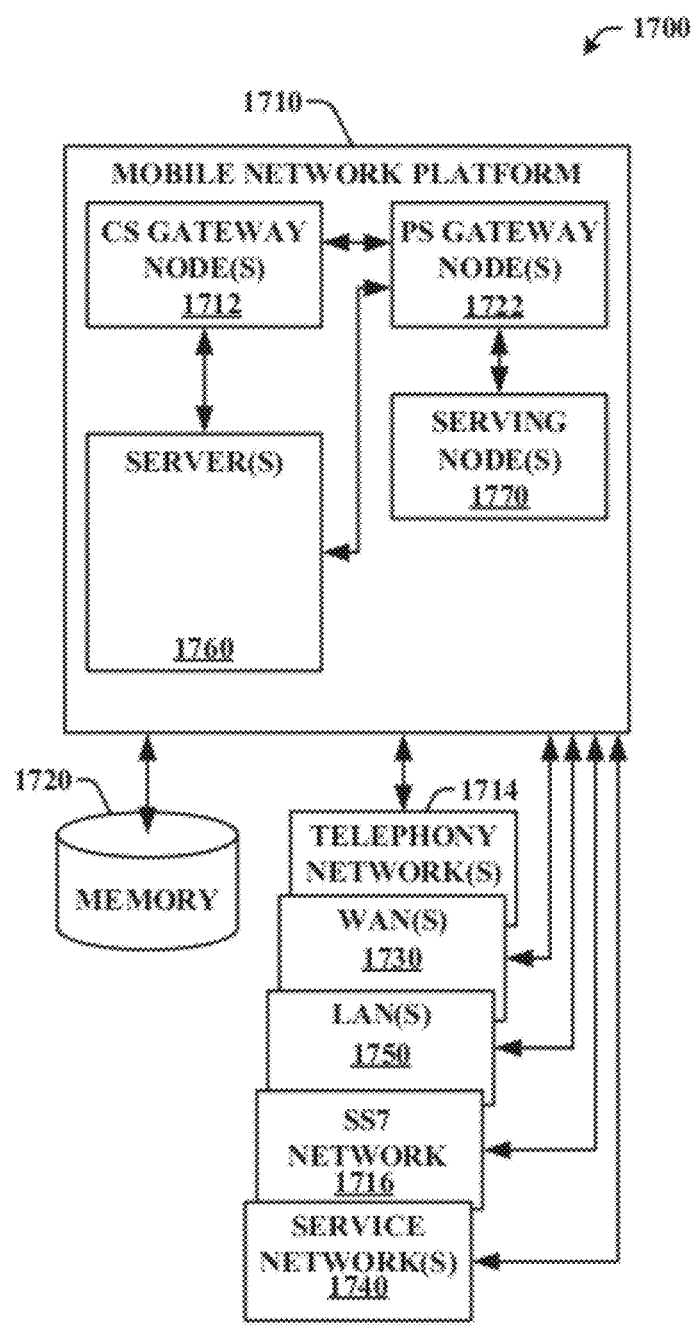

To provide further context for various aspects described herein, FIG. 15 illustrates a non-limiting example block diagram of a system 1500 of a mobile 1505 that can deliver content(s) or signaling directed to a device in accordance with aspects described herein. Additionally, FIG. 16 illustrates a non-limiting example block diagram of a system 1600 of a non-mobile device 1605, which can be provisioned through a non-mobile network platform and can be employed to convey content(s) or signaling to a device in accordance with aspects described herein. Furthermore, FIG. 17 illustrates a non-limiting example block diagram of a system 1700 of a mobile network platform 1710 which can provide content management service in accordance with aspects described herein.

In the mobile 1505 of FIG. 15, which can be a multimode access terminal, a set of antennas $1509_1$-$1509_Q$ (Q is a positive integer) can receive and transmit signal(s) from and to wireless devices like access points, access terminals, wireless ports and routers, and so forth that operate in a radio access network. It should be appreciated that antennas $1509_1$-$1509_Q$ are a part of communication platform 1510, which comprises electronic components and associated circuitry that provide for processing and manipulation of received signal(s) and signal(s) to be transmitted; e.g., receivers and transmitters 1512, mux/demux component 1514, and mod/demod component 1516.

In the system 1500, multimode operation chipset(s) 1520 allows mobile 1505 to operate in multiple communication modes in accordance with disparate technical specification for wireless technologies. In an aspect, multimode operation chipset(s) 1520 utilizes communication platform 1510 in accordance with a specific mode of operation (e.g., voice, Global Positioning System (GPS)). In another aspect, multimode operation chipset(s) 1520 can be scheduled to operate concurrently (e.g., when Q>1) in various modes or within a multitask paradigm.

Mobile 1505 includes malware mitigation component 1522 and can convey content(s) or signaling in accordance with aspects described herein. It should be appreciated that malware mitigation component 1522, can include a display interface that renders content in accordance with aspects of an user prompt component (not shown) that resides within malware mitigation component 1522.

Mobile 1505 also includes a processor 1535 configured to confer functionality, at least in part, to substantially any electronic component within mobile 1505, in accordance with aspects described herein. As an example, processor 1535 can be configured to execute, at least in part, instructions in multimode operation chipset(s) that afford multimode communication through mobile 1505 such as concurrent or multitask operations of two or more chipset(s). As another example, processor 1535 can facilitate mobile 1505 to receive and convey signaling and content(s) (e.g., various data flows) that are part of an active management act initiated by a subscriber that operates mobile 1505, or an approval cycle associated with auxiliary subscribers (e.g., secondary subscriber, tertiary subscriber . . . ). Moreover, processor 1535 facilitates mobile 1505 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1555 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 1500, processor 1535 is functionally coupled (e.g., through a memory bus) to memory 1555 in order to store and retrieve information necessary to operate and/or confer functionality, at least in part, to communication platform 1510, multimode operation chipset(s) 1520, malware mitigation component 1522, and substantially any other operational aspects of multimode mobile 1505.

FIG. 16 is a block diagram of an example system 1600 of a non-mobile device that can convey content(s) exploit various aspects of content transaction(s) as described herein. Device 1605 includes a functional platform 1610 that comprises a set of components (not shown) that provide, at least in part, one or more specific functionalities of the non-mobile device 1605. Additionally, non-mobile device 1605 includes a malware mitigation component 1625 that operates in accordance with aspects described herein before. Moreover, in an aspect, non-mobile device 1605 can include a communication platform 1630 that can provide wireless communication capabilities in addition, or alternatively, to connectivity of non-mobile device 1605 through wired links (e.g., Ethernet, USB, GPIB, RS-232, FireWire, optical or coaxial cable connection to a network interface such as network interface, or router (not shown)). With respect to wireless capability, in non-mobile device 1605, which can be a multimode access terminal, a set of antennas $1637_1$-$1637_P$ (P is a positive integer) can receive and transmit signal(s) from and to wireless devices like access points, access terminals, wireless ports and routers, etc., that operate in a radio access network. Communication platform 1630 can exploit the set of P antennas $1637_1$-$1637_K$, (K is a positive integer) to establish communication within various modes such as single-input single-output, or multiple-input multiple output.

Additionally, in non-mobile device 1605, a peripheral platform 1640 can include, or facilitate connection to, additional devices such as printer(s), media player(s), wireless router(s) (e.g., network interface), biometrics touch-pad(s), etc. In an aspect, to afford such connectivity, peripheral platform 1640 can include jacks for one or more of Ethernet, USB, GPIB, RS-232, FireWire, optical or coaxial cable connectors. Additionally, display interface 1645 can be a part of functional platform 1610 (e.g., when non-mobile device 1605 is a PC, an IPTV interface, a mobile, a back projector component, a data projector . . . ). In an aspect, display interface 1645 can be a liquid crystal display (LCD), a plasma panel, a monolithic thin-film based electro-chromic display, and so on. It should be appreciated that rendering areas in display interface 1645 can be substantially disparate.

It should be appreciated that non-mobile device 1605 also can include a data entry interface 1650 that can allow an end user to perform at least one of (i) command non-mobile device via configuration of functional platform 1610, (ii) deliver content(s) or signaling directed in accordance to aspects described herein, or (iii) generate content(s) (e.g., images via a built-in camera) or directive(s) for subscribed content.

Power supply 1675 can power-up device 1605 and substantially any component included thereon. It should be appreciated that alternative or additional embodiments of device 1605 may not include power supply 1675 and be powered via an attachment to a conventional power grid.

In the system 1600, non-mobile device 1605 includes processor 1685 which can be functionally coupled (e.g., through a memory bus) to memory 1695 in order to store and retrieve information to operate and/or confer functionality, at least in part, to malware mitigation component 1625, and substantially any component(s) thereon in accordance with aspects described herein; functional platform 1610; communication platform 1630 and substantially any other component of non-mobile device 1605. With respect to malware mitigation component 1625, and components thereon, processor 1685 can be configured to execute access protocols to convey credentials and gains access to a content management service to convey multimedia content(s) or signaling to a subscribed WDMF. In addition, in connection with communication platform 1630, processor 1685 is configured to confer functionality, at least in part, to substantially any electronic component within communication platform 1630. Moreover, processor 1685 facilitates communication platform 1630 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1695 also can retain multimedia content(s) or security credentials (e.g., passwords, encryption keys, digital certificates) that facilitate access to a content management service. In addition, memory 1695 can store data structures (e.g., metadata); code structure(s) (e.g., modules, objects, classes, procedures) or instructions, or substantially any type of software or firmware that processor 1685 can execute to provide functionality associated with functional platform 1610; network or device information like policies and specifications; code sequences for scrambling, spreading and pilot (e.g., reference signal(s)) transmission; and so on.

FIG. 17 illustrates a block diagram 1700 of a mobile network platform 1710 which can provide a malware mitigation in accordance with aspects described herein. Generally, mobile network platform 1710 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of network platform 1710 can be employed to effect communication in accordance with aspects described herein.

With respect to CS communication, mobile network platform 1710 includes CS gateway node(s) 1712 which can interface CS traffic received from legacy networks such as telephony network(s) 1714 (e.g., public switched telephone network (PSTN), or public land mobile network (PLMN)) or a SS7 network 1716. Circuit switched gateway node(s) 1712 can authorize and authenticate traffic (e.g., voice) arising from such networks. Additionally, CS gateway node(s) 1712 can access mobility, or roaming, data generated through SS7 network 1716; for instance, mobility data stored in a visitation location register (VLR), which can reside in memory 1720. Moreover, CS gateway node(s) 1712 interfaces CS-based traffic and signaling and gateway node(s) 1722. As an example, in a 3GPP UMTS network, CS gateway node(s) 1712 can be embodied, at least in part, in gateway GPRS support node(s) (GGSN).

In addition to receiving and processing CS-switched traffic (e.g., content(s) that can be part of a content(s) transmitted by a service provider) and signaling, PS gateway node(s) 1722 can authorize and authenticate PS-based data sessions with served mobile devices, non-mobile devices, and access points. Data sessions can include traffic, or content(s), exchange with networks external to the mobile network platform 1710, such as wide area network(s) (WANs) 1730 or service network(s) 1740; it should be appreciated that local area network(s) (LANs) 1750 can also be interfaced with mobile network platform 1710 through PS gateway node(s) 1722. Packet-switched gateway node(s) 1722 generates packet data contexts when a data session is established. To that end, in an aspect, PS gateway node(s) 1722 can include a tunnel interface (e.g., tunnel termination gateway (TTG) in 3GPP UMTS network(s) (not shown)) which can facilitate packetized communication with disparate wireless network (s), such as network platform and associated radio access network, Wi-Fi networks. It should be further appreciated that the packetized communication can include multiple flows that can be generated through service (e.g., provisioning) and application server(s) 1760. It is to be noted that in 3GPP UMTS network(s), PS gateway node(s) 1722 (e.g., GGSN) and tunnel interface (e.g., TTG) comprise a packet data gateway (PDG).

The mobile network platform 1710 also includes serving node(s) 1770 that convey the various packetized flows of data streams (e.g., content(s) or signaling directed to a subscribed data), received through PS gateway node(s) 1722. As an example, in a 3GPP UMTS network, serving node(s) 1770 can be embodied in serving GPRS support node(s) (SGSN).

Server(s) 1760 in mobile network platform 1710 can execute numerous applications (e.g., location services, online gaming, wireless banking, wireless device management . . . ) that can generate multiple disparate packetized data streams or flows, and manage (e.g., schedule, queue, format . . . ) such flows. Such application(s), for example can include add-on features to standard services provided by mobile network platform 1710. Data streams (e.g., content(s) or signaling directed to a file) can be conveyed to PS gateway node(s) 1722 for authorization/authentication and initiation of a data session, and to serving node(s) 1770 for communication thereafter.

Server(s) 1760 can also effect security (e.g., implement one or more firewalls) of mobile network platform 1710 to ensure network's operation and data integrity in addition to authorization and authentication procedures that CS gateway node(s) 1712 and PS gateway node(s) 1722 can enact. Moreover, server(s) 1760 can provision services from external network(s), e.g., WAN 1730, or Global Positioning System (GPS) network(s) (not shown). It is to be noted that server(s) 1760 can include one or more processors configured to confer at least in part the functionality of macro network platform 1710. To that end, the one or more processor can execute code instructions stored in memory 1720, for example.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, et cetera), optical disks (e.g., compact disk (CD), digital versatile disk (DVD), et cetera), smart cards, and flash memory devices (e.g., card, stick, key drive, et cetera). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

As used herein, the term "identifying information" is intended to be contact information known at the time a communication is connected relating to a party of the communication and can include (but is not limited to) telephone numbers, aliases, messenger names and identifiers, e-mail addresses, extensions, device personal identification numbers (PINs), distribution lists, network addresses, component addresses (e.g., medium access control (MAC) addresses, machine addresses, et cetera) or other component identifiers, user names, nicknames, domains, signatures (electronic, physical, and otherwise), references, forwarding configurations, and network addresses. The term "communication" as used when two or more devices correspond is intended to expansively capture all means of transmission or reception available to state-of-the-art devices and can include (but is not limited to) cellular, satellite transmission, VOIP and SIP voice connections, short message service (SMS) exchanges, broadcast data, network sessions, e-mails, instant messages, other network-based messaging, PIN or other device-based messaging, voicemail, picture mail, video mail, mixed-content correspondence, Unified Messaging (UM), and other digital and analog information transmitted between parties in any local and/or distant, physical and/or logical region.

Similarly, the concept of "data transmission" herein is intended to broadly represent known means of information exchange with digital or analog systems, including but not limited to hard-wired and direct connections (e.g., local media, universal serial bus (USB) cable, integrated drive electronics (IDE) cable, category 5 cable, coaxial cable, fiber optic cable and telephone cable), shared connections (e.g., remote and/or distributed resources) wireless connections (e.g., Wi-Fi, Bluetooth, infrared wireless, and personal area network connections), messaging systems (e.g., short message service (SMS), instant messaging, and other network-enabled other messaging), mobile or cellular transmissions and combinations thereof (e.g., personal communication system (PCS) and integrated networks), Unified Messaging, and other means of techniques of communication employed by telephones, personal digital assistants (PDAs), computers and network devices. "Mixed-content message," as used herein, is intended to represent communications employing one or more means of data transmission to present one or more varieties of device-capable content, including (but not limited to) picture messages, audio or video messages, and messages where text or other media types accompany one another. A "user device" can include, but is not limited to, data-enabled telephones (cellular telephones, smart phones, soft phones, VOIP and SIP phones, satellite phones, telephones coupled to computer systems, et cetera), communications receivers, personal digital assistants, pagers, portable e-mail devices, portable web browsers, media devices capable of receiving data, portable computers, and other electronics that allow a user to receive communications from other parties.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise historic data on previously served queries; communication party information from various sources; files and applications; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of aspects of the claimed subject matter. It is, of course, not possible to describe every conceivable combination of components or methods for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim. Embodiments and examples provided in the foregoing are non-exhaustive and understood to capture similar functionality known as of the disclosures herein.

What is claimed is:

1. A method, comprising:
   receiving, by a system comprising a processor, data identifying an interne protocol address that is associated with actions determined to be characteristic of malicious software behavior, and a profile of the malicious software behavior being exhibited, wherein the data comprises information identifying a physical location;
   comparing, by the system, the interne protocol address and the information identifying a physical location to a mobility log that stores information identifying a set of internes protocol addresses used by a set of devices at a set of physical locations associated with a wireless network;
   determining, by the system, an identity of a device associated with the internes protocol address by matching the interne protocol address to one of the set of internet protocol addresses and the physical location to one of the set of physical locations that corresponds to the device; and
   communicating, by the system, the profile to the device in response to a length of time that the internet protocol address is associated with the device being determined to satisfy a minimum duration threshold.

2. The method of claim 1, further comprising:
   communicating, by the system, the profile to the device based on the physical location.

3. The method of claim 1, wherein the determining the identity of the device comprises determining an international mobile subscriber identity.

4. The method of claim 1, wherein the receiving the data identifying the internet protocol address associated with the actions that were determined to be characteristic of the malicious software behavior comprises receiving data associated with a network activity determined to be exhibiting bot behavior associated with the interne protocol address.

5. The method of claim 1, wherein the comparing the internet protocol address to the mobility log comprises querying a general packet radio service support node device.

6. The method of claim 1, further comprising:
   identifying, by the system, an application on the device that is exhibiting the actions characteristic of the malicious software behavior; and
   deleting, by the system, packets associated with the application.

7. The method of claim 6, wherein the identifying the application comprises correlating the profile of the malicious software behavior to data traffic associated with the device.

8. The method of claim 6, further comprising:
   sending, by the system, a command to the device to delete the application in response to determining that the actions characteristic of malicious software behavior are harmful to the wireless network.

9. The method of claim 1, further comprising:
   in response to the length of time being determined not to satisfy the minimum duration threshold, waiting, by the system, for a second length of time in which the device is associated with a second interne protocol address that is associated with actions determined to be characteristic of malicious software behavior; and
   communicating, by the system, the profile to the device in response to the length of time and the second length of time being determined to satisfy the minimum duration threshold.

10. The method of claim 9, wherein the communicating the profile is in response to a sum of the length of time and the second length of the time being determined to satisfy a defined match duration.

11. A system, comprising:
   a memory to store instructions; and
   a processor, coupled to the memory, to facilitate execution of the instructions to perform operations, comprising:
      receiving information associated with activity indicative of malicious software behavior, wherein the activity is associated with an interne protocol address, and wherein the information comprises a first location that is associated with malicious software behavior;
      analyzing a set of records regarding activities of a set of devices associated with a network;
      determining an identity of a device determined to have been assigned the interne protocol address when the activity indicative of the malicious software behavior occurred;
      matching a second location of the device with the first location associated with the malicious software behavior;
      determining an amount of time that the interne protocol address was associated with the device; and
      sending the information associated with the activity indicative of the malicious software behavior directed to the device in response to the amount of time being determined to satisfy a minimum duration threshold.

12. The system of claim 11, wherein the operations further comprise: maintaining the set of records at a general packet radio service support node device.

13. The system of claim 11, wherein the malicious software behavior comprises bot behavior.

14. The system of claim 11, wherein the identity of the device comprises an international mobile equipment identity associated with the device.

15. The system of claim 11, wherein the operations further comprise:
   comparing the activity indicative of the malicious software behavior to data traffic associated with the device;
   identifying an application on the device that is a source of the activity based on the comparing; and
   mitigating the activity.

16. The system of claim 11, wherein the operations further comprise:
   in response to the amount of time being determined not to satisfy the minimum duration threshold, waiting for a second length of time in which the device is associated with a second internet protocol address that is associated with actions determined to be characteristic of malicious software behavior; and communicating the profile to the device in response to the length of time and the second length of time being determined to satisfy the minimum duration threshold.

17. The system of claim 16, wherein the minimum duration threshold is based on a minimum duration of time to establish positive device identification.

18. A method, comprising:
receiving, by a system comprising a processor, information identifying an internet protocol address that is determined to be exhibiting bot behavior, a profile of the bot behavior, and a time associated with the bot behavior, wherein the information comprises information identifying a location that is associated with malicious software behavior;
analyzing, by the system, a mobility log that records internet protocol address assignments by network devices of a network;
determining, by the system, that a device in a set of devices associated with the network was assigned the internet protocol address at the time the internet protocol address was exhibiting the bot behavior;
comparing, by the system, the location associated with the malicious software behavior with a set of locations stored in a mobility log;
determining, by the system, an identity of the device based on the analyzing and the comparing; and
in response to a length of time that the internet protocol address is associated with the device being determined to satisfy a minimum duration threshold, communicating the profile directed to the device.

19. The method of claim 18, wherein the confirming the identity of the device comprises determining that the device has been associated with a different Internet protocol address exhibiting other bot behavior.

20. The method of claim 18, further comprising:
in response to the length of time being determined not to satisfy the minimum duration threshold, waiting, by the system, for a second length of time in which the device is associated with a second interne protocol address that is associated with actions determined to be characteristic of malicious software behavior; and
communicating, by the system the profile to the device in response to the length of time and the second length of time being determined to satisfy the minimum duration threshold.

* * * * *